United States Patent
Gerber et al.

(10) Patent No.: US 8,527,627 B2
(45) Date of Patent: Sep. 3, 2013

(54) INTELLIGENT MOBILITY APPLICATION PROFILING WITH RESPECT TO IDENTIFIED COMMUNICATION BURSTS

(75) Inventors: Alexandre Gerber, Madison, NJ (US); Zhuoqing Morley Mao, Ann Arbor, MI (US); Feng Qian, Basking Ridge, NJ (US); Subhabrata Sen, New Providence, NJ (US); Oliver Spatscheck, Randolph, NJ (US); Zhaoguang Wang, Ann Arbor, MI (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 170 days.

(21) Appl. No.: 12/967,627

(22) Filed: Dec. 14, 2010

(65) Prior Publication Data
US 2012/0151041 A1 Jun. 14, 2012

(51) Int. Cl.
*G06F 15/173* (2006.01)

(52) U.S. Cl.
USPC ............................ 709/224; 709/223; 370/229

(58) Field of Classification Search
USPC ......... 709/223–224; 370/229–230, 328–329; 455/450, 524–525
See application file for complete search history.

(56) References Cited

U.S. PATENT DOCUMENTS

| | | | |
|---|---|---|---|
| 5,678,036 A | 10/1997 | Lin et al. | |
| 5,764,641 A | 6/1998 | Lin | |
| 6,201,966 B1 | 3/2001 | Rinne et al. | |
| 6,438,573 B1 | 8/2002 | Nilsen | |
| 6,507,731 B1 | 1/2003 | Hasegawa | |
| 6,519,266 B1 * | 2/2003 | Manning et al. | 370/328 |
| 6,553,031 B1 | 4/2003 | Nakamura et al. | |
| 6,584,331 B2 | 6/2003 | Ranta | |
| 6,978,143 B1 | 12/2005 | Vialen | |
| 6,999,432 B2 * | 2/2006 | Zhang et al. | 370/328 |
| 7,058,826 B2 * | 6/2006 | Fung | 709/224 |
| 7,089,380 B1 | 8/2006 | Schober | |
| 7,181,667 B2 | 2/2007 | Argyropoulos et al. | |
| 7,206,286 B2 | 4/2007 | Abraham et al. | |
| 7,209,462 B2 | 4/2007 | Sayeedi | |
| 7,295,119 B2 * | 11/2007 | Rappaport et al. | 709/223 |
| 7,317,732 B2 | 1/2008 | Mills et al. | |
| 7,349,371 B2 | 3/2008 | Schien et al. | |

(Continued)

OTHER PUBLICATIONS

300 Million UMTS Subscribers: Mobile Broadband Goes Global http://www.umts-forum.org/content/view/2522/110/. Downloaded Dec. 14, 2010, 1 page.

(Continued)

*Primary Examiner* — Bharat N Barot
(74) *Attorney, Agent, or Firm* — Turocy & Watson, LLP

(57) ABSTRACT

Systems and methods for analyzing mobile device applications within a wireless data network are presented herein. More particularly, described herein is a novel Intelligent Mobility Application Profiling Tool (iMAP) and/or other mechanisms, systems and methods for profiling and benchmarking applications associated with mobile devices in a wireless data network. Various systems and methods described herein expose cross-layer interaction associated with a network device in order to profile an application on the network device with respect to energy efficiency, performance, and functionality. As described herein, radio resource control (RRC) analysis can be performed to infer RRC states associated with a given application, identify tail time, etc. Further, analyzers are employed for various layers, including transmission control protocol (TCP) and/or hypertext transfer protocol (HTTP), as well as to analyze communication bursts associated with a given application. Analysis results are subsequently utilized to deliver application profiling results to a user.

20 Claims, 14 Drawing Sheets

(56) References Cited

U.S. PATENT DOCUMENTS

| | | | |
|---|---|---|---|
| 7,349,433 B2* | 3/2008 | Ho | 370/328 |
| 7,620,054 B2 | 11/2009 | Katayama | |
| 7,630,346 B2 | 12/2009 | Schein et al. | |
| 7,634,542 B1 | 12/2009 | Krause et al. | |
| 7,801,525 B2 | 9/2010 | Benco et al. | |
| 7,818,786 B2 | 10/2010 | Yoon et al. | |
| 7,855,951 B2 | 12/2010 | Kim et al. | |
| 7,860,063 B2 | 12/2010 | Low et al. | |
| 7,860,065 B2 | 12/2010 | Oishi et al. | |
| 7,864,794 B2 | 1/2011 | Diab et al. | |
| 7,912,455 B2 | 3/2011 | Adams et al. | |
| 7,934,658 B1 | 5/2011 | Bhatti et al. | |
| 8,054,791 B2* | 11/2011 | Vujcic | 370/329 |
| 8,060,606 B2 | 11/2011 | Friedman et al. | |
| 8,089,925 B1 | 1/2012 | Uhlik et al. | |
| 8,155,022 B1 | 4/2012 | Ainsworth | |
| 8,180,550 B2 | 5/2012 | Oshima et al. | |
| 8,199,770 B2 | 6/2012 | Diab et al. | |
| 8,244,443 B2 | 8/2012 | Oshima et al. | |
| 8,281,060 B2 | 10/2012 | Supalov et al. | |
| 8,284,736 B2 | 10/2012 | Liu et al. | |
| 2003/0103475 A1 | 6/2003 | Heppe et al. | |
| 2003/0214962 A1 | 11/2003 | Allaye-Chan et al. | |
| 2005/0047533 A1 | 3/2005 | Ruelke et al. | |
| 2006/0187480 A1 | 8/2006 | Tsuchiya et al. | |
| 2006/0217118 A1 | 9/2006 | Benco et al. | |
| 2006/0270422 A1 | 11/2006 | Benco et al. | |
| 2007/0189205 A1* | 8/2007 | Terry et al. | 370/328 |
| 2009/0046631 A1* | 2/2009 | Meylan et al. | 370/328 |
| 2009/0239545 A1* | 9/2009 | Lee et al. | 455/450 |
| 2009/0326769 A1 | 12/2009 | Oshima et al. | |
| 2009/0326777 A1 | 12/2009 | Oshima et al. | |
| 2009/0326779 A1 | 12/2009 | Oshima et al. | |
| 2010/0017077 A1 | 1/2010 | Oshima et al. | |
| 2010/0046543 A1 | 2/2010 | Parnaby | |
| 2010/0118752 A1 | 5/2010 | Suzuki et al. | |
| 2010/0161387 A1 | 6/2010 | Harrang et al. | |
| 2010/0188969 A1 | 7/2010 | Kim et al. | |
| 2011/0029664 A1 | 2/2011 | Harrang et al. | |
| 2011/0060927 A1 | 3/2011 | Fillingim et al. | |
| 2011/0179153 A1 | 7/2011 | Maspultra et al. | |
| 2011/0269463 A1 | 11/2011 | Wang et al. | |
| 2011/0280220 A1* | 11/2011 | Jia et al. | 370/328 |
| 2012/0008496 A1 | 1/2012 | Saavedra | |
| 2012/0047505 A1 | 2/2012 | Branson et al. | |
| 2012/0052814 A1 | 3/2012 | Gerber et al. | |
| 2012/0151041 A1 | 6/2012 | Gerber et al. | |
| 2012/0191309 A1 | 7/2012 | Oshima et al. | |
| 2012/0218983 A1 | 8/2012 | Noh et al. | |
| 2012/0265875 A1 | 10/2012 | Moran et al. | |
| 2012/0324041 A1 | 12/2012 | Gerber et al. | |
| 2013/0016736 A1 | 1/2013 | Parnaby | |

OTHER PUBLICATIONS

Configuration of Fast Dormancy in Release-8. 3GPP discussion and decision notes RP-090960, 3GPP TSG-RAN#45, Sevilla, Spain Sep. 15-18, 2009. Last accessed Feb. 11, 2011, 3 pages.

System Impact of Poor Proprietary Fast Dormancy Implementations. 3GPP discussion and decision notes RP-090941, TSG-RAN meeting #45 , Seville, Spain, Sep. 15-18, 2009. Last accessed Feb. 11, 2011, 2 pages.

Falaki, et al. A First Look at Traffic on Smartphones. IMC'10, Nov. 1-3, 2010, Melbourne, Australia. http://research.microsoft.com/en-us/um/people/ratul/papers/imc2010-smartphone-traffic.pdf. Last accessed Feb. 11, 2011, 7 pages.

Balasubramanian, et al. Augmenting Mobile 3G Using WiFi. MobiSys'10, Jun. 15-18, 2010, San Francisco, California, USA. http://research.microsoft.com/en-us/um/people/ratul/papers/mobisys2010-wiffler.pdf. Last accessed Feb. 11, 2011, 13 pages.

Balasubramanian, et al. Energy Consumption in Mobile Phones: A Measurement Study and Implications for Network Applications. IMC'09, Nov. 4-6, 2009, Chicago, Illinois, USA. Last accessed Dec. 15, 2010, 14 pages.

Chakravorty, et al. WWW Performance over GPRS. In IEEE MWCN, 2002. http://www.cl.cam.ac.uk/research/srg/netos/coms/rc277/mwen_cr.pdf. Last accessed Feb. 11, 2011, 5 pages.

Huang, et al. Anatomizing Application Performance Differences on Smartphones. MobiSys'10, Jun. 15-18, 2010, San Francisco, California, USA. http://research.microsoft.com/pubs/131377/MobiSys10-3GTest.pdf. Last accessed Feb. 11, 2011, 13 pages.

Falaki, et al. Diversity in Smartphone Usage. MobiSysi 0, Jun. 15-18, 2010, San Francisco, California, USA. http://portal.acm.org/citation.cfm?id=1814453&CFID=9592070&CFTOKEN=64926078. Last accessed Feb. 11, 2011, 16 pages.

Qian, et al. Characterizing Radio Resource Allocation for 3G Networks. IMC'10, Nov. 1-3, 2010, Melbourne, Australia. Last accessed Dec. 15, 2010, 14 pages.

Qian, et al. TOP: Tail Optimization Protocol for Cellular Radio Resource Allocation. In ICNP, 2010. http://www.eecs.umich.edu/~zmao/Papers/ICNP2010.pdf. Last accessed Feb. 11, 2011, 10 pages.

Schulman, et al. Bartendr: A Practical Approach to Energy-aware Cellular Data Scheduling. MobiCom'10, Sep. 20-24, 2010, Chicago, Illinois, USA. http://www.cs.umd.edu/~schulman/docs/mobicom10-bartendr.pdf. Last accessed Feb. 11, 2011, 12 pages.

Shepard, et al. LiveLab: Measuring Wireless Networks and Smartphone Users in the Field. In Hot-Metrics, 2010. http://hotmetrics.cs.caltech.edu/pdfs/paper12_final.pdf. Last accessed Feb. 11, 2011, 5 pages.

Zhang, et al. Accurate Online Power Estimation and Automatic Battery Behavior Based Power Model Generation for Smartphones. CODES+ISSS'10, Oct. 24-29, 2010, Scottsdale, Arizona, USA. http://www.eecs.umich.edu/~zhiyunq/pub/powertutor.pdf. Last accessed Feb. 11, 2011, 10 pages.

Qian et al. iMAP: Intelligent Mobile Application Profiling Tool. Last accessed Oct. 13, 2010, 14 pages.

iMAP: Intelligent Mobility Application Profiling Tool. Last accessed Sep. 16, 2010, 6 pages.

Liers. Static RRC Timeouts for Various Traffic Scenarios. In PIMRC, 2007, IEEE 18th International Symposium on Personal, Indoor and Mobile Radio Communications, 2007, Sep. 3-7, 2007, Athens, pp. 1-5. http://ieeexplore.ieee.org/Xplore/login.jsp?url=http://ieeexplore.ieee.org/iel5/4393982/4393983/04394275.pdf%3Farnumber%3D4394275&authDecision=-203.

Yeh, et al. Comparative Analysis of Energy-Saving Techniques in 3GPP and 3GPP2 Systems. IEEE Transactions on Vehicular Technology, Jan. 2009, vol. 58, Issue 1, pp. 432-448. http://ieeexplore.ieee.org/Xplore/defdeny.jsp?url=http://ieeexplore.ieee.org/stamp/stamp.jsp%3Ftp%3D%26arnumber%3D4490170%26userType%3D&denyReason=-134&arnumber=4490170&productsMatched=null&userType=.

Sharma. Simplicity of LTE and its differences with UMTS RRC, posted online on Aug. 6, 2009. http://3g4g.blogspot.com/2009/08/simplicity-of-lte-and-its-differences.html, 2 pages.

"UE "Fast Dormancy" Behaviour. 3GPP discussion and decision notes R2-075251, 2007. 3GPP TSG-RAN WG2, Jeju, South Korea, Nov. 5-9, 2007. http://ftp.3gpp.org/specs/html-info/TDocExMtg—R2-60-26016.htm. Last accessed Dec. 9, 2010, 12 pages."

"Configuration of Fast Dormancy in Release-8. 3GPP discussion and decision notes RP-090960, 2009, Seville, Spain Sep. 15-18, 2009. http://ftp.3gpp.org/specs/html-info/TDocExMtg—RP-45—26390.htm. Last accessed Dec. 9, 2010, 3 pages."

"System Impact of Poor Proprietary Fast Dormancy Implementations. 3GPP discussion and decision notes RP-090941, Seville, Spain, Sep. 15-18, 2009. http://3g4g.blogspot.com/2010/10/fast-dormancy-in-release-8.html. Last accessed Dec. 10, 2010, 2 pages."

"ANAND, et al. Self-Tuning Wireless Network Power Management. Wireless Networks, 11(4), 2005, Proceedings of the 9th Annual International Conference on Mobile Computing and Networking, MobiCom'03. http://portal.acm.org/citation.cfm?id=939004&CFID=1282940&CFTOKEN=71026603. Last accessed Dec. 10, 2010, 14 pages."

"Balasubramanian, et al. Energy Consumption in Mobile Phones: A Measurement Study and Implications for Network Applications. IMC'09, Nov. 4-6, 2009, Chicago, Illinois, USA; ACM 978-1-

60558-770-7/09/11 http://portal.acm.org/results.cfm?h=1&cfid=1282940&cftoken=71026603. Last accessed Dec. 10, 2010, 14 pages."

"Chatterjee, et al. Optimal MAC State Switching for cdma2000 Networks. IEEE 0-7803-7476-2/02, INFOCOM 2002. 2002.http://crewman.uta.edu/publicationfiles/cdma-mainak.pdf. Last accessed Dec. 10, 2010, 7 pages"

"System Parameter Recommendations to Optimize PS Data User Experience and UE Battery Life, Engineering Services Group, 80-W1112-1, Revision B, Mar. 2007. http://www.qualcomm.co.in/common/documents/white_papers/ESG_Optimizing_PS_Data_User_Experience_RevB.pdf. Last accessed Dec. 10, 2010, 9 pages."

"Ghaderi, et al. TCP-Aware Resource Allocation in CDMA Networks. MobiCom'06, Sep. 23-26, 2006, Los Angeles, California, USA. http://delivery.acm.org/10.1145/1170000/1161114/p215-ghaderi.pdf?key1=1161114&key2=4990991921&coll=DL&dl=ACM&CFID=1282940&CFTOKEN=71026603. Last accessed Dec. 10, 2010, 12 pages."

"Haverinen, et al. Energy Consumption of Always-On Applications in WCDMA Networks. Proceedings of IEEE Vehicular Technology Conference, 2007. http://www.pasieronen.com/publications/haverinen_siren_eronen_vtc2007.pdf. Last accessed Dec. 20, 2010, 5 pages."

"Liu, et al. Experiences in a 3G Network: Interplay between the Wireless Channel and Applications. MobiCom'08, Sep. 14-19, 2008, San Francisco, California, USA. http://citeseerx.ist.psu.edu/viewdoc/summary?doi=10.1.1.142.8214. Last accessed Dec. 20, 2010, 12 pages."

"Sridharan, et al. Distributed Uplink Scheduling in CDMA Networks. In Proceedings of IFIP-Networking 2007, May 2007. http://citeseerxist.psu.edu/viewdoc/summary?doi=10.1.1.86.5478. Last accessed Dec. 20, 2010, 12 pages."

Zhuang, et al. A3: ApplicationAware Acceleration for Wireless Data Networks. MobiCom'06, Sep. 23-26, 2006, Los Angeles, California, USA. http://www.google.co.in/url?sa=t&source=web&cd=1&ved=0CBYQFjAA&url=http%3A%2F%2Fciteseerx.ist.psu.edu%2Fviewdoc%2Fdownload%3Fdoi%3D10.1.1.135.2488%26rep%3Drep1%26type%3Dpdf&rct=j&q=A3%3A%20Application-Aware%20Acceleration%20for%20Wireless%20Data%20Networks.&ei=NEoPTZLbLYaKlwf9klz1Cw&usg=AFQjCNGrsXHqsbDm7u_Bavg7Kj0Fo2-J_Q. Last accessed Dec. 20, 2010, 12.

Lee et al Impact of Inactivity Timer on Energy Consumption in WCDMA and cdma2000 http://ir.lib.nthu.edu.tw/bitstream/987654321/18573/1/2030228030019.pdf. Last accessed Dec. 20, 2010, 10 pages.

"Li, et al. Service Quality's Impact on Mobile Satisfaction and Intention to Use 3G Service. Proceedings of the 42nd Hawaii International Conference on System Sciences—2009, IEEE 978-0-7695-3450-3/09. http://www.computer.org/portal/web/csdl/doi/10.1109/HICSS.2009.902. Last accessed Dec. 20, 2010, 10 pages."

"Chuah, et al. Impacts of Inactivity Timer Values on UMTS System Capacity. In Wireless Communications and Networking Conference, 2002, vol. 2, pp. 897-903. http://ieeexplore.ieee.org/Xplore/login.jsp?url=http://ieeexplore.ieee.org/iel5/7793/21424/00993390.pdP/03Farnumber%3D993390&authDecision=-203".

"Liers, et al. Static RRC Timeouts for Various Traffic Scenarios. In Proceedings of International Symposium on Personal, Indoor and Mobile Radio Communications (PIMRC), Sep. 3-7, 2007, pp. 1-5. http://ieeexplore.ieee.org/articleSale/Sarticle.jsp?arnumber=4394275".

"Liers, et al. UMTS Data Capacity Improvements Employing Dynamic RRC Timeouts. In Proceedings of International Symposium on Personal, Indoor and Mobile Radio Communications, PIMRC, Sep. 11-14, 2005, vol. 4, pp. 2186-2190. http://ieeexplore.ieee.org/xpl/freeabs_all.jsp?arnumber=1651833&abstractAccess=no&userType=".

"Talukdar, et al. Radio Resource Control Protocol Configuration for Optimum Web Browsing. In Proceedings IEEE 56th Vehicular Technology Conference, 2002, vol. 3, pp. 1580-1584. http://ieeexplore.ieee.org/xpl/freeabs_all.jsp?arnumber=1040482".

"Tan, et al. Measurement-based Performance Model of IP Traffic over 3G Networks. TENCON 2005, IEEE Region 10, pp. 1-5, Nov. 2005. http://ieeexplore.ieee.org/xpl/freeabs_all.jsp?arnumber=4085057".

"Yeh, et al. Comparative Analysis of Energy-Saving Techniques in 3GPP and 3GPP2 Systems. IEEE transactions on vehicular technology, 58(1):432-438, Jan. 2009. http://ieeexplore.ieee.org/Xplore/login.jsp?url=http://ieeexplore.ieee.org/iel5/25/4356907/04490170.pdf%3Farnumber%3D4490170&authDecision=-203".

U.S. Appl. No. 12/872,604 "Tail Optimization Protocol for Cellular Radio Resource Allocation" Gerber et al. US Patent Application Publication No. 2012/0052814A1. Publication Date Mar. 1, 2012.

Office Action dated Mar. 12, 2013 for U.S. Appl. No. 12/872,604, 27 pages.

* cited by examiner

US 8,527,627 B2

INTELLIGENT MOBILITY APPLICATION PROFILING WITH RESPECT TO IDENTIFIED COMMUNICATION BURSTS

TECHNICAL FIELD

This disclosure relates generally to network communications and, more specifically to techniques for monitoring performance of applications operating within a wireless communication network.

BACKGROUND

A wireless communication system can be utilized to provide wireless access to various communication services (e.g., voice, video, data, messaging, content broadcast, etc.) for users of the system. Wireless communication systems can operate according to a variety of network specifications and/or standards, such as Universal Mobile Telecommunications System (UMTS), Third Generation Partnership Project (3GPP) Long Term Evolution (LTE), High Speed Packet Access (HSPA). These specifications and/or standards use different modulation techniques, such as Code Division Multiple Access (CDMA), Time Division Multiple Access (TDMA), Frequency Division Multiple Access (FDMA), Multi-Carrier CDMA (MC-CDMA), Single-Carrier CDMA (SC-CDMA), Orthogonal Frequency Division Multiple Access (OFDMA), Single-Carrier Frequency Division Multiple Access (SC-FDMA), and so on.

As data networks (e.g., Wi-Fi data networks, etc.) and data network coverage has become increasingly ubiquitous, the demand for diverse smartphone applications and other network applications has increased. However, despite a significant amount of such applications developed by both the active user community and professional developers, a large amount of challenges are encountered in the development of mobile applications when compared to their desktop counterparts for a variety of reasons. For example, mobile applications exhibit limited resources, both in terms of device capabilities as well as network resources. Further, mobile applications operate in a dynamically varying and diverse execution environment due to user mobility and resource contention. In addition, mobile applications are associated with constrained user interaction caused by restricted user interfaces conventionally employed by mobile devices.

In view of at least the above, application developers conventionally lack tools to address the challenges associated with mobile application development. In particular, mobile application developers are hindered by a lack of visibility into the resource-constrained mobile execution environment, with often dynamically varying resources and the potentially complex interaction with the application behavior. Accordingly, it would be desirable to implement improved techniques for mobile application profiling and development.

SUMMARY

The following presents a simplified summary of various aspects of the disclosed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed subject matter in a simplified form as a prelude to the more detailed description that is presented later.

In accordance with various embodiments, described herein are systems and methods associated with a mechanism, referred to herein as an Intelligent Mobile Application Profiling tool (iMAP), for analyzing mobile applications associated with a wireless data network. The iMAP tool exposes cross-layer interaction for layers ranging from higher level layers, such as user input and application behavior, down to the lower level protocol layers, such as hypertext transport protocol (HTTP), transport, and radio resources. Such cross-layer information, which encompasses device-specific and network-specific information, aids in capturing the tradeoffs across important dimensions such as energy efficiency, performance, and functionality, making such tradeoffs explicit rather than arbitrary as in conventional mobile application development. Accordingly, various embodiments herein aid an application developer in revealing inefficient resource usage due to a lack of transparency in the lower-layer protocol behavior involving resources such as radio network resources. This, in turn, can lead to suggestions for improvement of the application(s) under development.

In one example provided herein, systems and methods employing an iMAP tool and/or other suitable mechanisms can operate according to various layers of analysis to profile mobile applications associated with a communication network. For example, radio resource control (RRC) analysis can be performed to infer RRC states associated with a given application, identify tail time, etc. In another example, analyzers can be employed for various layers including transmission control protocol (TCP), HTTP, or the like. In a further example, communication bursts associated with a given application are analyzed. In another example provided herein, the analysis performed according to one or more layers can subsequently be utilized to deliver application profiling results to a user.

In accordance with one aspect, a method as described herein can be implemented by at least one processor and/or other means. The method can include the acts of obtaining network activity data relating to at least one network device; analyzing cross-layer interaction associated with the network activity data between at least one of a RRC layer, a transport layer, or an application layer; and identifying bursts indicated within the network activity data and triggering factors of the bursts based at least in part on the cross-layer interaction associated with the network activity data.

In accordance with another aspect, a system that can be implemented as described herein can include a data collection component configured to obtain information relating to communication activity of at least one network device. The system can further include an activity analysis component configured to conduct cross-layer analysis of the information obtained by the data collection component with respect to at least one of a RRC layer, a transport layer, or an application layer. Additionally, the system can include a burst analysis component configured to identify communication bursts within the communication activity of the at least one network device and to infer triggers of the communication bursts. The system can also include an application profiling component configured to profile at least one application associated with the at least one network device based at least in part on the cross-layer analysis conducted by the activity analysis component and the bursts identified by the burst analysis component.

In accordance with a further aspect, a computer-readable medium is described herein, which can include a computer-readable storage medium having computer-executable code and/or other data stored thereon. More particularly, the computer-readable medium can include code for causing a computer to obtain network device operation data including packet trace data and user input data; code for causing a computer to analyze the network device operation data on a RRC layer, a transport layer and an application layer with respect to at least one network device application; code for causing a computer to identify bursts within the network device operation data; code for causing a computer to identify triggering factors of the bursts within the network device operation data based at least in part on the analysis of the network device operation data; and code for causing a computer to generate a performance profile of the at least one network device application based at least in part on the analysis of the network device operation data, the bursts within the network device operation data, and the triggering factors of the bursts.

The following description and the annexed drawings set forth in detail certain illustrative aspects of the disclosed subject matter. These aspects are indicative, however, of but a few of the various ways in which the principles of the disclosed subject matter may be employed. The disclosed subject matter is intended to include all such aspects and their equivalents. Other advantages and distinctive features of the disclosed subject matter will become apparent from the following detailed description of the innovation when considered in conjunction with the drawings.

DETAILED DESCRIPTION

Figure 1:
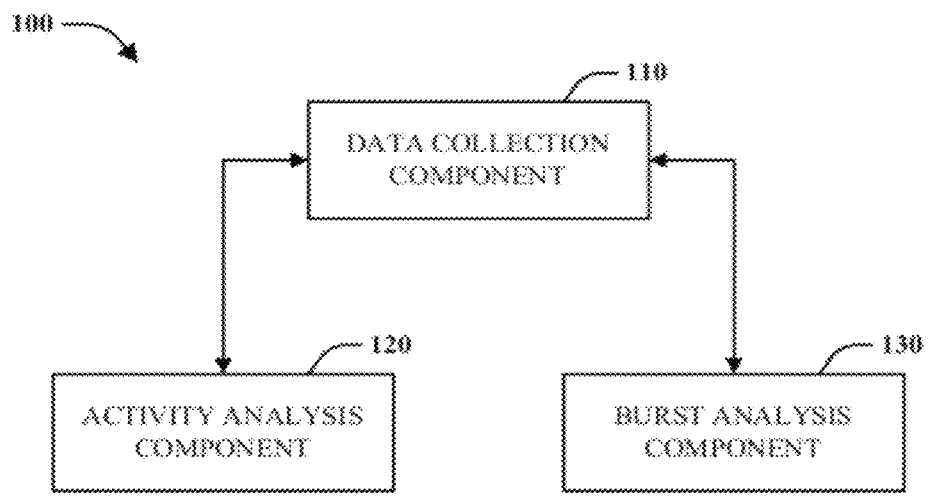
FIG. 1 is a block diagram of a system for profiling a mobile communication application in accordance with various aspects described herein.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used herein, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "Node B," "Evolved Node B" (e-Node B or eNB), "Home Node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

Referring now to the drawings, FIG. 1 illustrates a system 100 for profiling a mobile communication application in accordance with various aspects described herein. The system 100 includes a data collection component 110, which is configured to collect network activity data relating to an application that can be utilized by a mobile device (e.g., a smartphone, a personal digital assistant (PDA), etc.) within a wireless data network. Subsequently, an activity analysis component 120 analyzes the network activity data collected by the data collection component 110 with respect to cross-layer interactions indicated by the network activity data. Additionally or alternatively, a burst analysis component 130 analyzes the network activity data collected by the data collection component 110 with respect to communication bursts indicated within the network activity data. Based on the analysis performed by the activity analysis component 120 and/or burst analysis component 130, the application corresponding to the network activity data can be profiled and/or otherwise characterized. Techniques by which system 100 and its constituent components can operate are provided in further detail herein.

Despite the popularity of mobile applications, their performance and energy bottlenecks remain hidden due to a lack of visibility into the resource-constrained mobile execution environment, which can in some cases exhibit dynamically varying resources and potentially complex interactions with application behavior. Accordingly, system 100 can be utilized to efficiently and accurately expose the cross-layer interaction among various layers, including radio resource channel state, transport layer, application layer, and user interaction, to enable the discovery of inefficient resource usage. To realize at least the foregoing, system 100 can provide analysis according to at least two aspects. First, system 100 facilitates accurate inference of lower-layer radio resource control states and network power consumption. Second, system 100 facilitates precise detection of energy and radio resource bottlenecks by jointly analyzing radio resource control states with application traffic patterns.

Figure 2:
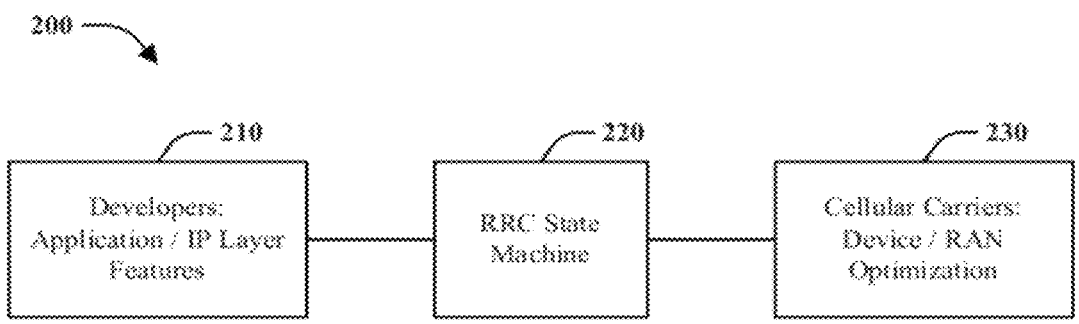
FIG. 2 illustrates an example network optimization framework for which various aspects described herein can be implemented.

In one aspect, system 100 can be utilized to implement an iMAP tool, which is designed to be a general framework for performing cross-layer correlation. Given the importance of cellular network resources on mobile application performance and energy efficiency, the following description focuses on correlation of the radio resource layer with the higher layers (e.g., transport, application, and user) to identify application radio resource and energy bottlenecks. In contrast to conventional application profiling mechanisms, various aspects herein provide for analysis of the interaction between applications and the radio access network (RAN). For example, as shown by system 200 in FIG. 2, various aspects described herein operate to leverage analysis of an RRC state machine 220 and/or other suitable mechanisms to facilitate analysis of cross-layer interaction associated with a mobility application, thereby providing a bond between developers 210 that create the mobility application and cellular carriers 230 that operate a network on which the mobility application is utilized.

In the following description, focus is placed on the Universal Mobile Telecommunications System (UMTS) 3G network; however, it should be appreciated that the aspects described herein can be applied to any suitable communications network. In one example, to manage radio resources and user equipment (UE) energy, a UMTS network can maintain a radio resource control (RRC) state machine for each UE. As shown in state diagrams 302 and 304 in FIG. 3, a UE can be in one of three RRC states, which can respectively be associated with different amounts of allocated radio resources and power. Application traffic patterns trigger RRC state transitions, which control radio resource utilization and UE energy consumption. In particular, the RRC state is demoted to a lower power state with less allocated radio resources after an idle time period. When an application has sufficient data to transfer, the RRC state is promoted to a higher power state. In an aspect, awareness of the RRC state information and the transition behavior can be utilized to ensure efficient network energy usage.

In the context of a UMTS network, the term "radio resource" as used herein refers to the Wideband CDMA (WCDMA) code space, the UMTS Terrestrial Radio Access Network (UTRAN) transmission power, and/or other factors that are potential bottlenecks of the network. To efficiently utilize the limited radio resources, the UMTS RRC protocol introduces a state machine associated with each UE 102. By way of example, the RRC state machine can utilize three RRC states—IDLE, CELL_FACH, and CELL_DCH, as shown by diagrams 302 and 304 in FIG. 3.

As shown in diagrams 302 and 304, IDLE is the default state when the UE is turned on. In this state, the UE has not established an RRC connection with the radio network controller (RNC); thus, no radio resource is allocated and the UE cannot transfer any data.

In the CELL DCH state, the RRC connection is established and a UE can be allocated dedicated DCH transport channels in both downlink (DL), e.g., RNC to UE, and uplink (UL), e.g., UE to RNC. This state allows the UE to fully utilize the radio resources for user data transmission. For brevity, the CELL_DCH state is also referred to herein as simply "DCH." In one example, when a large amount of UEs are in DCH, the radio resources can in some cases be exhausted due to the lack of channelization codes in the cell. As a result, some UEs may be required to use low-speed shared channels, although in such a case their RRC states remain at DCH.

In the CELL_FACH state, the RRC connection is established but there is no dedicated channel allocated to the UE. Instead, the UE can only transmit user data through shared low-speed channels (e.g., less than 20 kbps). For brevity, the CELL_FACH state is also referred to herein as simply "FACH." FACH is generally designed for applications requiring very low data throughput rate.

It can be appreciated that state promotions and demotions distinguish cellular networks (e.g., UMTS, etc.) from other types of access networks, such as Wi-Fi, LAN, or the like. In one example, a state promotion (e.g., an allocation of radio resources) incurs a promotion delay of up to several seconds due to RAN processing overheads for radio resource allocation. State demotions (e.g., releasing radio resources) are controlled by inactivity timers. The inactivity timer itself, also known as tail time, can last up to, e.g., 15 seconds. As a tail time is the idle time period matching the inactivity timer value before a state demotion, it can be appreciated that the tail time leads to inefficiency in radio resource usage and battery energy.

Returning to FIG. 1, system 100 can be utilized to mitigate the lack of visibility of cellular-specific characteristics that hinders smartphone application developers from building cellular-friendly applications due to the complicated tradeoffs involved and the inaccessibility of the low-layer RRC state information. For example particular, analysis can be performed as described herein for the RRC layer, the TCP layer, the HTTP layer, user interactions, and cross-layer interactions between one or more of the above layers, thereby revealing the impact of smartphone applications on radio resources and battery life.

In one example, iMAP as implemented by system 100 and/or other systems described herein utilizes an online lightweight data collector and an offline but efficient and accurate analysis module. To profile an application, an iMAP user simply starts the data collector and then runs the application for a desired duration as a normal application user. The collector captures packet traces, system and user input events, which are subsequently processed by the analysis module (e.g., on a commodity computer). In addition to UMTS, various aspects described herein can also apply to other types of cellular radio access network (RAN), such as General Packet Radio Service (GPRS)/Enhanced Data Rates for GSM Evolution (EDGE), Evolution-Data Optimized (EvDO), and 4G Long Term Evolution (LTE), that involve similar tradeoffs to those in UMTS.

In accordance with an aspect, iMAP as described herein utilizes an algorithm that accurately infers RRC states from packet traces collected on a UE. Using a simulation-based approach to infer RRC states, the inference algorithm targets a scenario where traces are captured directly on a UE, in contrast to previous algorithms that assume that traces are collected at the cellular core network. Additionally, the inference algorithm utilized by iMAP significantly improves inference accuracy over previous algorithms by performing more fine-grained simulation of uplink and downlink transmission queues to precisely capture state promotions.

In accordance with another aspect, it can be observed that low efficiency of radio resource and energy usage can be attributed to short traffic bursts carrying small amounts of user data while having long idle periods injected before and after the bursts. Thus, iMAP as described herein can employ algorithms to identify bursts and to identify triggering factors of the bursts, e.g., user input, TCP loss, or periodical application requests, by synthesizing analysis results of the RRC, TCP, and HTTP layer. Discovering such triggering factors can be utilized for understanding the root cause of inefficient resource utilization. While previous algorithms investigate impact of traffic patterns on radio power management policy and propose suggestions such as reducing the tail time to save UE energy, iMAP provides more specific suggestions by quantitatively breaking down resource consumption into each burst with its triggering factor inferred.

Figure 3:
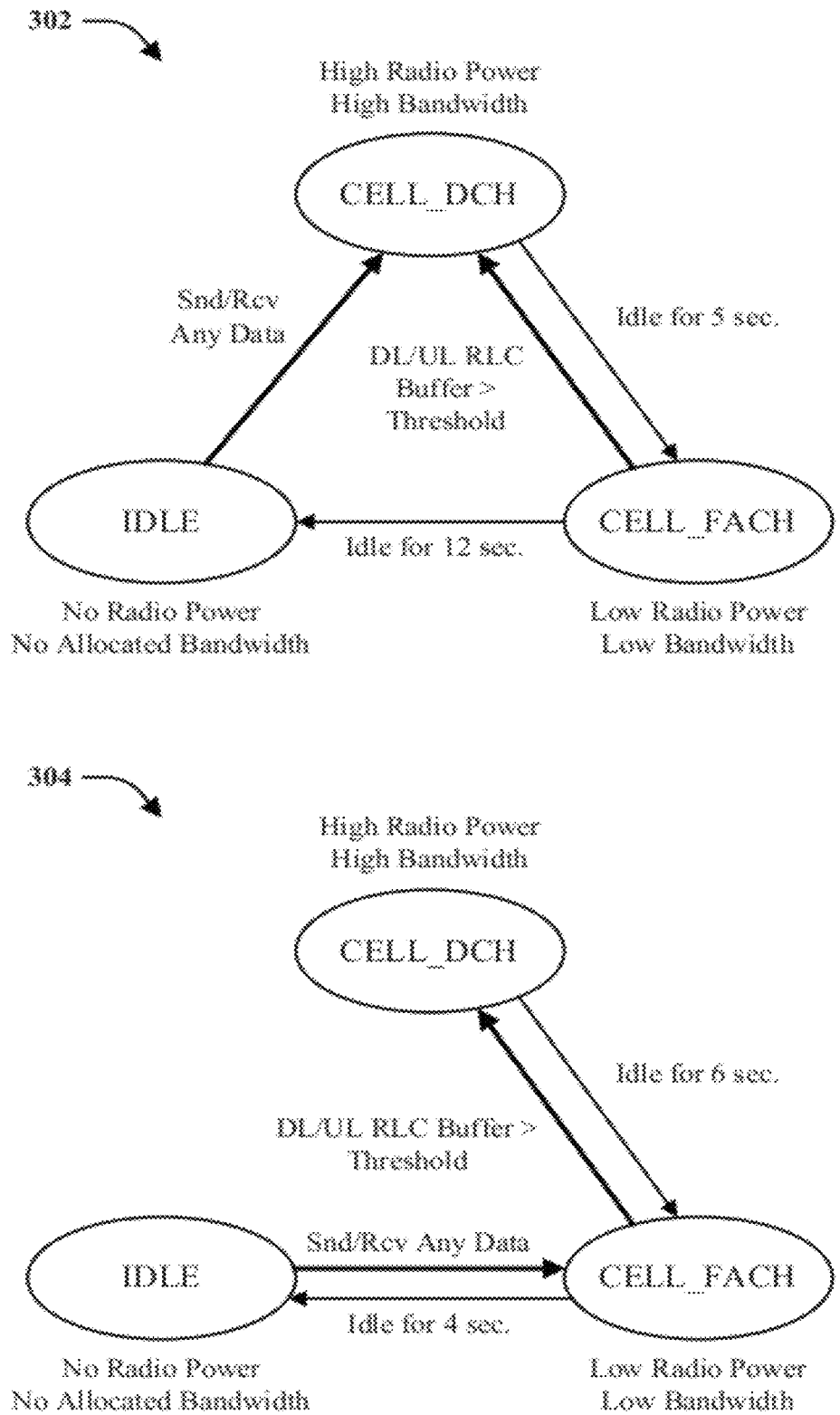
FIG. 3 illustrates example state transition schemes that can be utilized by a wireless terminal in accordance with various aspects.
Figure 4:
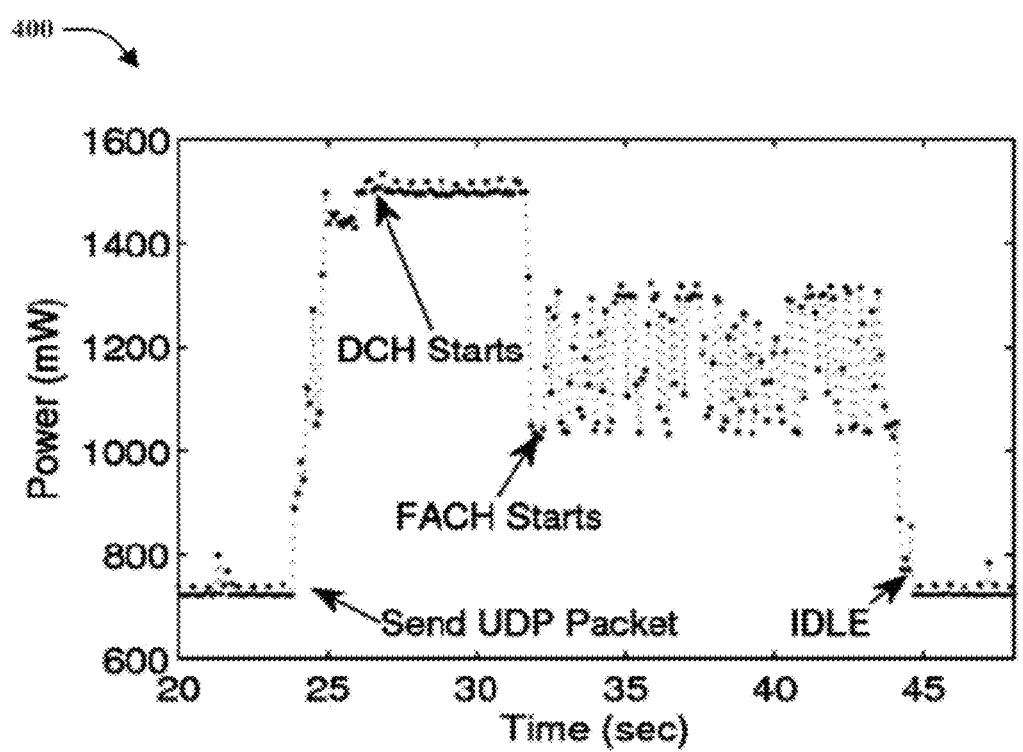
FIG. 4 illustrates example power consumption data associated with respective RRC states employed by a network device.

Graph 400 in FIG. 4 illustrates the impact of tail times on UE energy consumption (e.g., based on RRC state diagram 302 in FIG. 3). The data of graph 400 was obtained by attaching the battery of a smartphone to a hardware power meter, which is also connected via USB to a PC and records fine-grained energy measurements by sampling the current drawn from the battery at a frequency of 500 Hz. During probing, the display of the smartphone was kept at a constant brightness level and Global Positioning System (GPS), Wi-Fi, and network activities were disabled. After keeping the smartphone in this inactive state for 20 seconds, a user datagram protocol (UDP) packet is sent at t=23.8 s, which triggers a promotion from IDLE to DCH that takes approximately 2 seconds. From t=26.1 s, the phone remains at the high-power DCH state for about 5 seconds (the DCH tail), then switches to the low-power FACH state at t=31.5 s. Finally after the FACH tail time period, at t=44.1 s, the phone returns to the IDLE state. During the tail time, the UE still occupies the transmission channel and the WCDMA codes, therefore the radio power consumption is kept at the corresponding level of the state.

In accordance with an aspect, it can be observed from graph 400 that inefficiency comes from short bursts of packets. In particular, it can be appreciated that a short burst has two negative impacts. First, a short burst incurs tail time. For example, in the extreme case shown in graph 400, a burst consisting of one packet keeps the UE on DCH or FACH for 17 seconds. On the other hand, a burst triggers one state promotion if the inter-burst time is longer than the inactivity timer. For example, assuming the UE is on DCH at the end of burst $B_i$, and denoting the inter-burst time between bursts $B_i$ and $B_{i+1}$ as $\delta$, if $\alpha \leq \delta < \alpha+\beta$, there will be one FACH-to-DCH promotion. Alternatively, if $\delta \geq \alpha+\beta$, then $B_{i+1}$ triggers one IDLE-to-DCH promotion. Here, $\alpha$ and $\beta$ are the inactivity timers for DCH and FACH, respectively. Long bursts also incur tail times and promotion delays, but the penalties are amortized by the long duration of the burst. Therefore, it can be appreciated that smartphone applications can generate a smaller number of short bursts by batching transfers together.

However, it can be appreciated that various factors hinder smartphone application developers from building UMTS-friendly applications. First, developers use the same programming language (e.g., Java, Objective C, etc.) as those used for developing PC applications. This makes it natural for programmers to employ the same programming styles for mobile applications and PC applications, which do not take cellular-specific characteristics into consideration. Second, many smartphone developers are unaware of the RRC state machine and its implications on radio resource and battery life. Third, even for experienced developers, it is difficult to quantify the energy and radio resource efficiencies of mobile applications due to the complicated tradeoff involved and the inaccessibility of the low-layer RRC state information.

Accordingly, various embodiments provided herein can be utilized to bridge the aforementioned gap. Toward this goal, iMAP can be utilized to assist application developers in building UMTS-friendly applications by automatically benchmarking efficiencies of radio resource and battery life and providing suggestions on improving the efficiencies.

With reference to a UMTS architecture on which various aspects described herein can function, a UMTS network includes three subsystems: a UE, a UMTS UTRAN, and the Core Network (CN). UEs are, e.g., mobile handsets that interact with end users. The UTRAN is the radio access network connecting UEs and the CN and can include two components: Node-Bs (e.g., base stations) and RNCs. The RNC is a governing element in UTRAN and is responsible for controlling multiple Node-Bs. The centralized CN is the backbone of the cellular network.

In one example, in UMTS networks, the Radio Resource Control (RRC) protocol introduces for each UE a state machine to efficiently utilize the limited radio resources (e.g., WCDMA codes, etc.). A single RRC state machine is maintained at both a UE and the RNC, which synchronizes the states via control channels. Typically there are three RRC states: IDLE, CELL_DCH, and CELL_FACH, as described above with regard to FIG. 3. As noted above, the three RRC states are referred to herein as IDLE, DCH, and FACH, respectively.

As noted above, when a UE is turned on, it is at the IDLE state by default. The UE has not established an RRC connection with the RNC, thus no radio resource is allocated and the UE cannot transfer any user data. The power consumption of its radio interface is almost zero at IDLE. At the DCH state, the RRC connection is established and a UE is typically allocated dedicated transport channels in both downlink (DL, RNC→UE), and uplink (UL, UE→RNC), allowing the UE to fully utilize radio resources for high-speed user data transmission. The radio power consumption at DCH is the highest (e.g., 600 to 800 mW). The FACH state is an intermediate state between IDLE and DCH. At FACH, the RRC connection is established but there are only low-speed shared channels (e.g., for both DL and UL) allocated to a UE. FACH is designed for applications with low data throughput rate. Radio power at FACH is, e.g., 55% to 75% of that at DCH.

As further noted above, there are two types of RRC state transitions: promotions (IDLE→DCH, FACH→DCH, and IDLE→FACH), and demotions (going in the reverse direction). Promotions (or demotions) switch from a state with lower (or higher) radio resource and radio power consumption to another state requiring more (or less) radio resources and power. State diagrams 302 and 304 in FIG. 3 show RRC state machines of two commercial UMTS carriers. As illustrated, promotions are triggered by user data transmission. A promotion from IDLE begins when user data transmission activity occurs, while a FACH→DCH promotion takes place when a UE sends or receives data at a higher speed, e.g., corresponding to the per-UE queue size, referred to as the RLC buffer size, exceeding a threshold in either direction. In one example, the UL and DL use separate RLC buffers. On the other hand, state demotions are triggered by two inactivity timers configured by the RNC. The DCH→FACH timer is denoted herein as $\alpha$, and the FACH→IDLE timers as $\beta$. At DCH state, the RNC resets the $\alpha$ timer to a threshold T whenever it observes any UL/DL data frame. If there is no user data transmission for T seconds, the $\alpha$ timer expires and the state is demoted to FACH. The $\beta$ timer uses a similar scheme.

As additionally noted above, promotion delays and tail times distinguish cellular networks from other types of access networks. An RRC state promotion incurs a long latency (e.g., up to 3 seconds), during which tens of control messages are exchanged between a UE and the RNC for resource allocation. A large number of state promotions increase management overheads at the RNC and worsen user experience. In contrast, state demotions take negligible time, but they incur tail times that cause significant waste of resources. A tail is the idle time period matching the inactivity timer value before a state demotion. During a tail time, a UE still occupies transmission channels and WCDMA codes, and its radio power consumption is kept at the corresponding level of the state. Due to the tail time, transmitting a small amount of data can cause significant radio energy and radio resource consumption.

Figure 5:
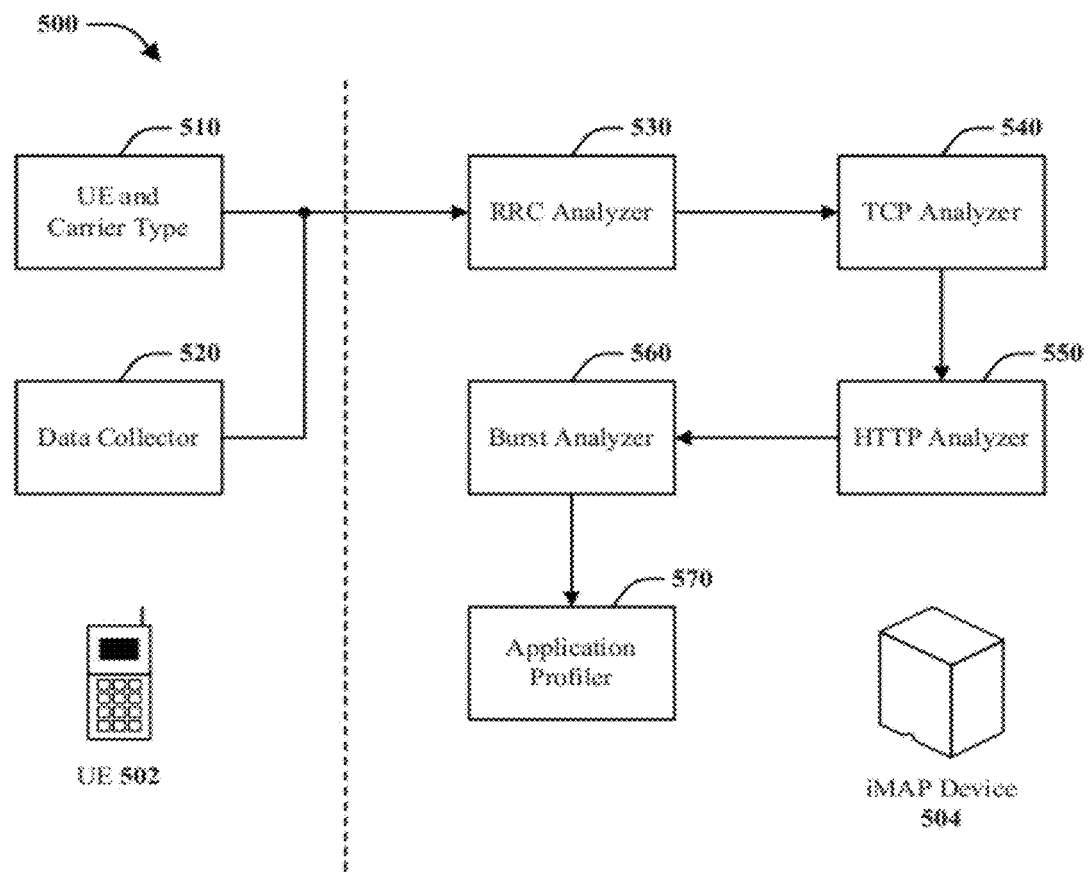
FIG. 5 is a block diagram of a system for profiling an application utilized by a mobile device for communication within a wireless data network in accordance with various aspects.

Referring next to FIG. 5, a system 500 is illustrated that provides an iMAP framework for profiling mobility applications in a wireless communication system. It can be appreciated that iMAP efficiently and accurately exposes the cross-layer interaction for multiple layers (from RRC to application layer) by analyzing traces passively collected on a UE 502. The iMAP tool includes two sets components: the data collector 520 and the analyzers 530-560. The data collector 520 runs efficiently on a UE 502 to capture information essential for understanding resource usage, user activity, and application performance. In one example, data collector 520 can collect network packet traces, user input events, application activities (e.g., API calls), system information (e.g., CPU usage), or the like. Collected traces are subsequently fed into the analyzers 530-560 operating at an iMAP device 504 for offline analysis. The design of the framework focuses on modularity to enable independent analysis of individual layers whose results can be subsequently correlated to enable joint cross-layer analysis. Further, the design is easily extensible to other analyzers of new application protocols.

In one example, the workflow of the iMAP tool can proceed as follows. First, the iMAP user invokes on her UE 502 the data collector 520, which subsequently collects relevant data, e.g., all packets in both directions and user input (e.g., tapping the screen). Note that unlike existing smartphone data collection mechanisms, the ability of data collector 520 to collect fine-grained user interaction events enables performance of correlation to other layers. In one example, packet-to-application correspondence can additionally be identified. This information is used to distinguish the target application, e.g., the application to be profiled, from other applications simultaneously accessing the network. In one example, data collector 520 can collect all packets, as RRC state transitions are determined by the aggregated traffic of all applications.

Second, the iMAP user launches the target application and uses the application as an end user for several minutes. Factors such as user behavior randomness and radio link quality affect the collected data and thus the analysis results. Thus, to obtain a representative understanding of the application studied, iMAP can be used across multiple runs or by multiple users to obtain a comprehensive exploration of different usage scenarios of the target application. The target application can also be explored in several usage scenarios, covering diverse functionalities, as well as execution modes (e.g., foreground, background, etc.).

Third, the iMAP user loads the iMAP analyzer with the collected traces. System 500 then configures the RRC analyzer 530 with UE- and carrier-specific parameters (e.g., given by UE and carrier type 510), which influence the models used for analysis. In one example, the TCP analyzer 540, HTTP analyzer 550, and burst analyzer 560 are independent of specific UEs or carriers.

Fourth, system 500 performs a series of analysis across several layers (e.g., via analyzers 540-550). In particular, the RRC state machine analysis accurately infers RRC states from packet traces to enable iMAP to obtain a complete view of radio resource and radio energy utilization during the entire data collection period. Transport protocol and application protocol analysis are additionally performed to associate each packet with its transport-layer functionality (e.g., TCP retransmission) and its application-layer semantics (e.g., an HTTP request). In one example, the analysis of system 500 can focus on TCP and HTTP, as TCP carries almost all cellular traffic and a significant portion of smartphone applications use HTTP to transfer application-layer data.

Finally, system 500 performs burst analysis via burst analyzer 560, which utilizes the aforementioned cross-layer analysis results, to understand the triggering factor of each short traffic burst (which, as noted above, is a significant cause of low resource efficiency). An application profiler 570 is then utilized to summarize and visualize the results. In one example, visualizing cross-layer correlation results greatly helps understand the time series of bursts that are triggered due to different reasons.

In one example, RRC analyzer 530 utilizes an algorithm that accurately infers RRC states and state transitions from packet traces collected on UEs. While the following description is provided with reference to the carrier corresponding to state diagram 302 in FIG. 3, it can be appreciated that RRC analysis as provided herein is also applicable to other carriers using a different state machine through slight modification.

While some previous approaches have applied a simulation-based approach to estimate RRC state machine statistics, the approach utilized by RRC analyzer 530 differs from previous work in two aspects. First, the previous algorithm assumes traces are collected at the cellular core network, while RRC analyzer 530 targets a more common scenario where traces are captured directly on a UE. Second, RRC analyzer 530 significantly improves inference accuracy by performing more fine-grained simulation of uplink and downlink RLC buffers to precisely capture state promotions.

Figure 6:
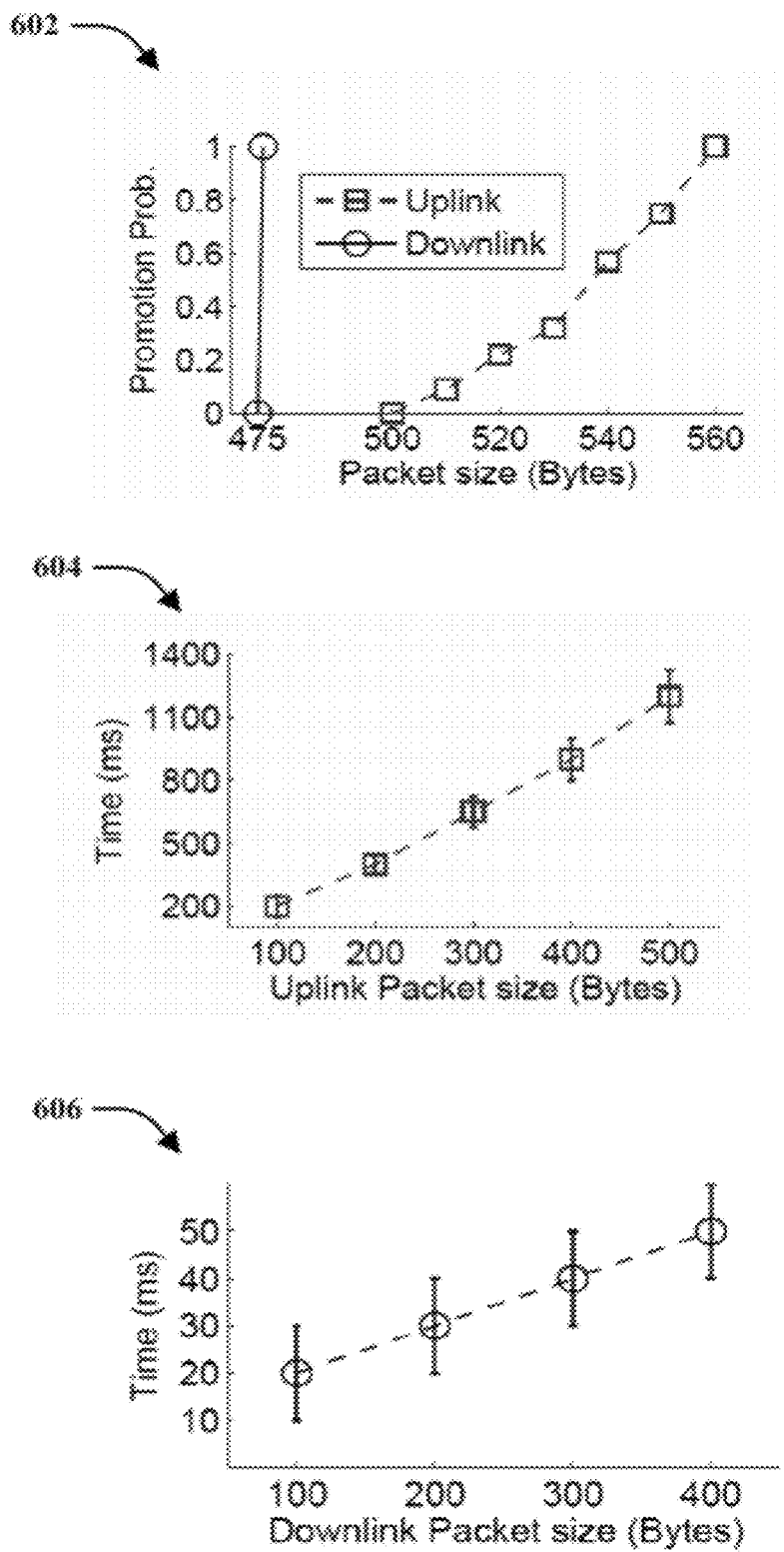
FIG. 6 illustrates example radio link control (RLC) buffer data that can be utilized for mobility application profiling in accordance with various aspects described herein.

In accordance with one aspect, controlled experiments can be conducted to measure the state machine parameters of a given carrier. Beyond the basic set of parameters such as inactivity timers and promotion delays, more detailed parameters (e.g., RLC buffer consumption rate and fast dormancy) are investigated, and previously undocumented behaviors (e.g., timers not reset) are observed to enable fine-grained analysis to more precisely capture state transitions. The measured parameters shown in Table 1 below, which are temporally and spatially stable, will be used by the state inference algorithm that follows. The RLC consumption time listed in Table 1 is obtained via quadratic curve fitting based on graphs 604 and 606 in FIG. 6, respectively.

TABLE 1

Carrier parameters for state inference.

| | Device 1 | Device 2 |
|---|---|---|
| FACH→IDLE Timer (α) | 12 sec | 3 sec |
| DCH→FACH Timer (β) | 5 sec | |
| RLC Buffer Thresholds | UL: 540 Bytes, DL: 475 Bytes | |
| RLC Consumption Time (UL) | $0.0014x^2 + 1.6x + 20$ ms | |
| RLC Consumption Time (DL) | $0.1x + 10$ ms | |
| IDLE→DCH Delay | $2.0 \pm 1.0$ sec | |
| FACH→DCH Delay | $1.5 \pm 0.5$ sec | |

While some previous approaches have applied a simulation-based approach to estimate RRC state machine statistics, the approach utilized by RRC analyzer 530 differs from previous work in two aspects. First, the previous algorithm assumes traces are collected at the cellular core network, while RRC analyzer 530 targets a more common scenario where traces are captured directly on a UE. Second, RRC analyzer 530 significantly improves inference accuracy by performing more fine-grained simulation of uplink and downlink RLC buffers to precisely capture state promotions.

Inactivity timers control the release of radio resources. Using various suitable methodologies, the DCH→FACH and FACH→IDLE timers are inferred to be 5s and 12s, respectively, for Device 1 listed above. The timer values are validated by measuring device energy consumption. RLC Buffer Thresholds are utilized in determining the promotions from FACH to DCH. For uplink traffic, data are generated at the RLC buffer of the UE before data transmission. If a UE is at FACH and the RLC buffer size is above a threshold, then the RNC promotes the UE state to DCH based on the RLC buffer measurement report sent by the UE via control channel. Another RLC buffer is maintained at the RNC for downlink, although both directions use the same RRC state machine.

In one example, the RLC buffer thresholds for UL and DL are measured separately. A packet of x bytes is transmitted at FACH from a UE (for measuring UL RLC buffer threshold) or from a controlled server (for DL RLC buffer threshold). Then, observing a FACH→DCH promotion indicates the RLC buffer threshold is smaller than x bytes (a promotion is detected by observing promotion delays). Otherwise, it is greater than or equal to x bytes. The measurement results are summarized in graph 602 in FIG. 6, where the Y axis corresponds to the probability of observing a FACH→DCH promotion when a packet of x bytes is sent. It can be observed that for DL, the threshold is fixed to 475 bytes while the RLC buffer threshold for UL varies from 500 to 560 bytes. Such a difference is in some cases due to the disparity between the UL and DL transport channels used by the FACH state.

In one example, RLC buffer consumption time quantifies how fast the RLC buffer is cleared after it is filled with data. It depends on channel throughput at FACH, since the RLC buffer is not emptied until all data in the buffer are transmitted [13]. In accordance with one aspect, the RLC buffer consumption time is inferred by transmitting two packets with delay in between. First, a packet of x bytes is sent at FACH by letting x be smaller than the RLC buffer threshold so it never triggers a FACH→DCH promotion. After a delay for y milliseconds, another packet of z bytes is sent in the same direction. Next, z is fixed at 500 bytes and 475 bytes for UL and DL, respectively, according to graph 602 (note that the exact value of z does not matter as long as x+z>the RLC buffer threshold>z). Subsequently, observing a FACH→DCH promotion suggests that the RLC buffer is not yet emptied when the second packet arrives at the buffer, causing the RLC buffer size exceeding the threshold.

Graph 604 shows the RLC buffer consumption time for the UL. For each packet size x (X axis), we vary the delay y (Y axis) at a granularity of 25 ms, and perform the aforementioned test for each pair of (x, y) for 20 times. The error bars in graph 604 cover a range of delays (y values) for which promotions are probabilistically observed. The results for the DL are shown in graph 606. As can be observed from graphs 604 and 606, the UL transport channel is significantly slower than the DL channel at FACH. Accordingly, considering RLC buffer consumption time helps more precisely capture FACH→DCH promotions, thus improving the state inference accuracy.

In one example, state promotion delay refers to the latency caused by a state promotion. In accordance with one aspect, the IDLE→DCH promotion delay and the FACH→DCH delay can be derived to be $2.0 \pm 1.0$ seconds and $1.5 \pm 0.5$ seconds, respectively.

With regard to cases where inactivity timers are not reset, it can be observed that for some carriers, the DCH→FACH timer is not reset when a UE has a small amount of data to transfer for both directions. In particular, a packet P does not reset the DCH→FACH timer if both UL and DL have transferred no more than 320 bytes (including P itself) within the past 300 ms. In one example, this can be done to save radio resources on DCH when there is little traffic demand by a UE.

In another example, fast dormancy can be utilized by a UE in some scenarios. In particular, instead of waiting for inactivity timers to expire, a UE can actively request for a state demotion by sending a special RRC control message to the RNC. For some network devices, it can be appreciated that state demotions are solely controlled by inactivity timers. Alternatively, a device can employ fast dormancy to release radio resources earlier to improve its battery life. However, the incurred drawbacks are extra state promotions causing additional RNC processing overhead and potentially worsening user experience.

In accordance with one aspect, RRC analyzer 530 in FIG. 5 can utilize a state inference algorithm as follows, which takes a packet trace $P_1, \ldots, P_n$ as input where $P_i$ is the i-th packet in a trace collected on a UE. The output is S(t), denoting the RRC state or state transition at any given time t. S(t) corresponds to one of the following: IDLE, FACH, DCH, IDLE→FACH, and FACH→DCH. The algorithm assumes the RRC state machine (which can be inferred by any suitable manner) and its parameters are known.

In one example, RRC analyzer 530 performs iterative packet-driven simulation. For example, let $P_i$ and $P_{i+1}$ be two consecutive packets whose arrival time are $t_i$ and $t_{i+1}$, respectively. Recall that the arrival time of an uplink or downlink packet is the time when the packet is observed by the UE. Intuitively, if $S(t_i)$ is known, then $\forall t_i < t \leq t_{i+1}$, S(t) can be inferred in O(1) based on the size and direction of $P_{i+1}$ and the inter-arrival time (IAT) between $P_i$ and $P_{i+1}$, by following the RRC state transition rules. Subsequently, $S(t_{i+2})$ can be iteratively computed based on $S(t_{i+1})$ and $P_{i+2}$, and so on.

Figure 7:
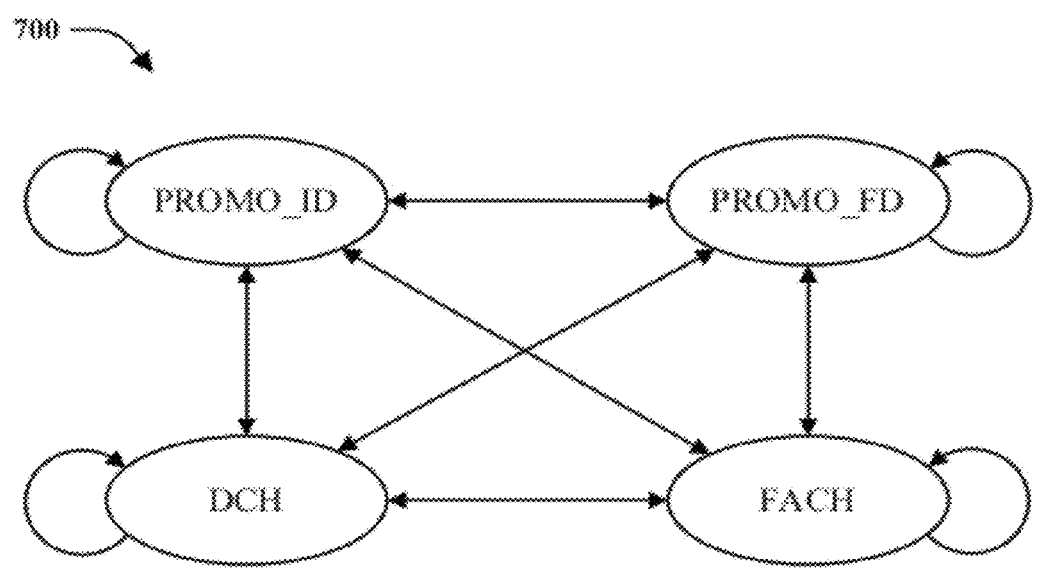
FIG. 7 illustrates an example RRC state machine that can be employed for RRC state inference in accordance with various aspects.

In accordance with one aspect, RRC analyzer 530 can capture state promotions that may take several seconds; however, it can be observed that promotions themselves do not exist in the RRC state machine diagram as illustrated by state diagrams 302 and 304 in FIG. 3. Therefore, a state diagram 700 can be considered as shown in FIG. 7 that includes two transitional states, PROMO_ID and PROMO_FD, that correspond to cases where a UE is performing an on-going IDLE→DCH promotion and an on-going FACH→DCH promotion, respectively. As shown in state diagram 700, the inference algorithm follows a different finite state machine for packet-driven simulation with state promotion delays taken into consideration. The states in state diagram 700 are referred to as simulation states, denoted as $S'(P_i)$, to distinguish them from RRC states S(t). A simulation state $S'(P_i)$ corresponds to an RRC state or promotion when packet $P_i$ is observed by a UE.

State diagram 700 illustrates a high-level technique for designing transition rules for simulation states. As mentioned above, a simulation state transition $S'(P_i) \rightarrow S'(P_{i+1})$ is determined by the following three factors:

(1) The IAT between $P_i$ and $P_{i+1}$. Depending on the IAT, a UE may experience tail times causing a state demotion then a possible state promotion when $P_{i+1}$ arrives, thus changing the simulation state. Additionally, the IAT may affect RRC state promotions from FACH to DCH given the non-trivial RLC buffer consumption time. Further, IAT may indicate a state promotion has finished. Taking only packet traces as input, it is inherently impossible to exactly pinpoint when a state promotion completes, as a promotion may finish between arrivals of two consecutive packets. Accordingly, measured promotion delay and the IAT are used to estimate state promotion durations.

(2) The packet size of $P_{i+1}$, which is compared against the RLC buffer threshold to determine a FACH→DCH promotion.

(3) The direction of $P_{i+1}$, depending on which the state promotion behavior observed at UE differs. Assuming that $P_{i+1}$ triggers a promotion, if $P_{i+1}$ is downlink, the promotion has already completed when the UE receives the packet, and therefore the simulation state is either DCH or FACH. On the other hand, if $P_{i+1}$ is uplink (e.g., the application merely places the packet into the uplink RLC buffer), then the state promotion has just begun, and as a result the simulation state is either PROMO_ID or PROMO_FD. It can be appreciated that IDLE is not a simulation state since a UE can no longer be at IDLE when a packet arrives in either direction.

In accordance with one aspect, a set of 23 rules can be utilized that cover all possible simulation state transitions shown in state diagram 700. Next, an example is utilized to illustrate a PROMO_ID→FACH transition. In the example, it is assumed that (i) the arrival time of $P_i$ and $P_{i+1}$ is $t_i=1.5$ s and $t_{i+1}=9$ s, respectively; (ii) $S'(P_i)=$PROMO_ID; (iii) $P_{i+1}$ is an uplink packet of 40 bytes; and (iv) the simulation state changes to PROMO_ID at t=0 s. Based on these assumptions, the RRC states of UE are: S(1.5 . . . 2)=IDLE→DCH (using a measured promotion delay of 2±1 sec as a best estimation, and the promotion has lasted for 1.5 sec before $P_i$); S(2 . . . 7)=DCH tail (the α timer is 5 sec); S(7 . . . 9)=FACH; and $S'(P_{i+1})=$FACH since the size of $P_{i+1}$ is smaller than the RLC buffer threshold.

The inference algorithm described above considers the aforementioned factors, including, e.g., RLC buffer threshold, RLC buffer consumption rate and the behavior where the DCH→FACH timer is not reset when throughput at DCH is low. In one example, RRC analyzer 530 performs best-effort estimation of the duration of a state promotion using measurement results.

In accordance with one aspect, iMAP as implemented by system 500 facilitates the accurate estimation of radio energy consumption by using inferred RRC states. Table 2 below reports measured average radio power for respective devices and carriers for each RRC state and during each state promotion. Assuming these average values are representative despite other factors such as signal strength which also directly impact power consumption, the state inference results enable iMAP to accurately profile radio energy consumption. Given the state inference results S(t) and the measured radio power values P(.) shown in Table 2 below, the radio energy from $t_1$ to $t_2$ can be computed as $\int_{t_1}^{t_2} P(S(t))dt$

TABLE 2

Average radio power consumption.

| | Device 1 Carrier 1 | Device 2 Carrier 1 | Device 3 Carrier 2 |
|---|---|---|---|
| P(IDLE) | 0 | 0 | 10 mW |
| P(FACH) | 460 mW | 450 mW | 401 mW |
| P(DCH) | 800 mW | 600 mW | 570 mW |
| P(FACH→DCH) | 700 mW | 550 mW | N/A |
| P(IDLE→DCH) | 550 mW | 530 mW | N/A |

In accordance with another aspect, system 500 can additionally perform analysis at higher layers, in particular the transport layer and the application layer. As illustrated in system 500, this analysis is performed via a TCP analyzer 540 and a HTTP analyzer 550; however, it can be appreciated that any suitable protocol(s) can be analyzed. In one example, system 500 can additionally leverage cross-layer analysis results to profile resource efficiency of smartphone applications.

In an aspect, TCP and HTTP analysis facilitate an understanding of traffic patterns created by the transport layer and the application layer. The description that follows focuses on TCP and HTTP, as TCP carries almost all cellular traffic, and a significant amount of smartphone applications use HTTP to transfer application-layer data. However, it can be appreciated that other protocols can be analyzed in addition to, or in place of, TCP and HTTP.

In one example, TCP analyzer 540 extracts TCP flows, defined by tuples of {srcIP, srcPort, dstIP, dstPort}, from the raw packet trace. Subsequently, TCP analyzer 540 infers the transport-layer property for each packet in each TCP flow. In particular, respective TCP packets can be assigned to one of the labels listed in Table 3 below. The labels can be classified into four categories covering the basic TCP protocol behavior: (i) connection management (ESTABLISH, CLOSE, and RESET); (ii) normal data transfer (DATA and ACK); (iii) TCP congestion, loss, and recovery (DATA_DUP, DATA_RECOVER, ACK_DUP, and ACK_RECOVER); and (iv) other special packets (e.g., TCP keep alive and zero-window notification).

TABLE 3

TCP Analysis - Transport-layer properties of packets.

| Label | Description |
| --- | --- |
| ESTABLISH | Packet containing the SYN flag |
| CLOSE | Packet containing the FIN flag |
| RESET | Packet containing the RST flag |
| DATA | Normal data packet with payload |
| ACK | Normal ACK packet without payload |
| DATA_DUP | Duplicate data packet |
| DATA_RECOVER | Data packet echoing a duplicate ACK |
| ACK_DUP | Duplicate ACK packet |
| ACK_RECOVER | ACK echoing a duplicate data packet |
| TCP_OTHER | Other special TCP packets |

In the third category of Table 3, DATA_DUP can be caused by experiencing a retransmission timeout or fast retransmission, and ACK_DUP can be triggered by receiving an out-of-order or duplicate data packet. Duplicate packets indicate packet loss, congestion, or packet order switching that may degrade TCP performance. A DATA_RECOVER packet has its sequence number matching the acknowledgement (ACK) number of previous duplicate ACK packets in the reverse direction, indicating the attempt of a UE to transmit a possibly lost uplink packet or a downlink lost packet finally arriving from a server. Similarly, the ACK number of an ACK_RECOVER packet equals the sequence number of some duplicate data packets plus one, indicating the recipient of the possibly lost data packet.

In accordance with another aspect, HTTP analyzer 550 performs HTTP analysis by reassembling TCP flows then following the HTTP protocol to parse the TCP flow data. In one example, HTTP analysis provides system 500 with precise knowledge of the mapping between packets and HTTP request or response.

With regard to burst analysis, as described above, low efficiencies of radio resources and energy utilization can be attributed to short traffic bursts carrying small amount of data. Accordingly, burst analyzer 560 can employ various algorithms to identify bursts and to infer the triggering factors of the bursts by synthesizing analysis results of the RRC, TCP, and HTTP layers. Discovering such triggering factors can be utilized in the context of understanding the root cause of inefficient resource utilization.

As used herein, a burst is defined as a set of consecutive packets whose inter-arrival time is less than a threshold δ. In one example, δ is set to 1.5 seconds, as such an interval is longer than commonly observed cellular round-trip times (RTTs). Since state promotion delays are generally greater than δ, detected state promotions are removed before bursts are identified.

A burst can be triggered by various factors. Understanding bursts and their triggering factors benefits application developers, who can then customize optimization strategies for each factor (e.g., to eliminate a burst, to batch multiple bursts, to make certain bursts appear less frequently, etc.). In some cases, bursts are found to be inherent to application behavior. In accordance with one aspect, burst analyzer 560 can utilize various algorithms to assigns to each burst a triggering factor. Example triggering factors are shown in Table 4 below.

TABLE 4

Burst Analysis - Burst triggering factors.

| Label | Burst triggering event |
| --- | --- |
| USER_INPUT | User interaction |
| LARGE_BURST | (The burst is large and long) |
| TCP_CONTROL | Control packets of TCP |
| SVR_NET_DELAY | Server or network delay |
| TCP_LOSS_RECOVER | TCP congestion/loss control |
| NON_TARGET | Other apps not to be profiled |
| APP | UE application itself |
| APP_PERIOD | Periodic transfers |

In accordance with one aspect, the algorithm listed in Table 5 below can be utilized by burst analyzer 560 and includes seven tests, each identifying a triggering factor by examining burst size/duration, user input events, payload size, packet direction, and TCP properties associated with a burst.

TABLE 5

Example burst analysis algorithm.

```
01  Burst_Analysis (Burst b) {
02    Remove packets of non-target apps;
03    if (no packet left) { return NON_TARGET; } // Test 1
04    if (b.payload > th_s && b.duration > th_d) // Test 2
05      { return LARGE_BURST; }
06    if (b.payload == 0) { // Test 3
07      if (b contains any of ESTABLISH, CLOSE, RESET,
08        TCP_OTHER packets)
09        { return TCP_CONTROL; }
10    }
11    d_0 ← direction of the first packet of b;
12    i_0 ← TCP label of the first packet of b;
13    if (d_0 == DL && (i_0 == DATA || i_0 == ACK)) // Test 4
14      { return SVR_NET_DELAY; }
15    if (i_0 == ACK_DUP && i_0 == ACK_RECOVER &&
16      i_0 == DATA_DUP && i_0 == DATA_RECOVER) // Test 5
17      { return TCP_LOSS_RECOVER; }
18    if (b.payload > 0 && find user input before b) // Test 6
19      { return USER_INPUT; }
20    if (b.payload > 0) { return APP; } // Test 7
21    else { return UNKNOWN; }
22  }
```

The tests illustrated in Table 5 above are conducted as follows. A burst can be generated by a non-target application not to be profiled by burst analyzer 560 (e.g., as determined by Test 1). For Test 2, if a burst is large enough and long enough (e.g., as determined by two thresholds $th_s$ and $th_d$), it is assigned a LARGE_BURST label so that burst analyzer 560 regards it as a resource-efficient burst. If a burst only contains TCP control packets without user payload (as shown in lines 06-08), then it is a TCP_CONTROL burst as determined by Test 3. To reveal delays caused by server, network, congestion or loss, the algorithm then considers properties of the first packet in the burst in Tests 4 and 5. For Test 6, if any user input activity is captured within a time window of ω seconds before a burst starts, then the burst is assigned a USER_INPUT label if it contains user payload. For bursts whose triggering factors are not identified by the above tests, they are considered to be issued by the application itself (e.g., APP in Test 7). In some cases, such bursts are periodic transfers (e.g., APP_PERIOD) triggered by an application using a software timer. A separate algorithm for reliably detecting periodic transfers is provided in further detail below.

The burst analysis algorithm outlined above involves three parameters: $th_s$ and $th_d$, which quantitatively determine a large burst (e.g., via Test 2), and the time window ω (e.g., as used in Test 6). By way of specific example, $th_s$=100 KB, $th_d$=5 sec, and ω=1 sec. However, it can be appreciated that any suitable values can be utilized.

As noted above, a separate algorithm can be utilized by burst analyzer 560 to detect APP_PERIOD bursts (e.g., as defined in Table 4), which are data transfers periodically issued by a UE application using a software timer. Such transfers are desirable to independently detect because their impact on resource utilization can be significant although they may carry very little actual data.

In one example, burst analyzer 560 focuses on detecting three types of commonly observed periodic transfers, though not mutually exclusive. The three types constitute the most simple forms of periodic transfers a UE application can perform using HTTP, namely (i) periodically fetching the same HTTP object, (ii) periodically connecting to the same Internet Protocol (IP) address, and (iii) periodically fetching an HTTP object from the same host. In accordance with one aspect, an example algorithm for detecting these periodic transfers is illustrated by Table 6 below. It can additionally be appreciated that detection of other periodic activities can be readily added to the detection framework shown in Table 6. Further, it can be observed that existing approaches for periodicity or clock detection (e.g., discrete Fourier transform (DFT)-based and autocorrelation-based approaches) do not work well in the scenarios analyzed by system 500 wherein the number of samples is fewer.

TABLE 6

Example algorithm for detecting periodic transfers.

```
01   Detect_Periodic_Transfers (t_1, t_2, ..., t_n) {
02     C ← {(d, t_i, t_j) | d = t_j − t_i ∀j > i};
03     Find the longest sequence
04       D = (d_1, x_1, y_1), ..., (d_m, x_m, y_m) in C s.t.
05         (1) y_1 = x_2, y_2 = x_3, ..., y_{m−1} = x_m, and
06         (2) max(d_i) − min(d_i) < p;
07     if m ≥ q return mean(d_1, ..., d_m);
08     else return "no periodic transfer found";
09   }
```

The algorithm illustrated in Table 6 takes as input a time series (e.g., timestamps of a connecting IP) $t1, \ldots, t_n$, and outputs the detected periodicity (e.g., the cycle duration) if it exists. It enumerates all $n(n-1)/2$ possible intervals between $t_i$ to $t_j$ where $1 \le i \le j \le n$ (e.g., as shown in line 02), from which the longest sequence of intervals is computed by dynamic programming (e.g., as shown at lines 03-06). Such intervals should be consecutive (e.g., as detected via line 05) and have similar values whose differences are bounded by parameter p (e.g., as determined via line 06). If the sequence length is long enough based on threshold parameter q, then the average interval is reported as the cycle duration (as shown at line 07). The algorithm empirically sets p=1.0 sec and q=3 based on applying the algorithm to randomly generated test data (e.g., periodical time series mixed with noise), and real traces.

In accordance with a further aspect, application profiler 570 profiles mobile applications using cross-layer analysis results obtained from the analyzers 530-560 in system 500. Initially, leveraging RRC state inference and burst analysis results, application profiler 570 can compute for each burst (with its triggering factor known) the associated radio resource and radio energy consumption. Subsequently, the TCP and HTTP analysis described above enables system 500 to associate each burst with transport layer or the application layer behavior such that a user of system 500 can learn quantitatively what causes the resource bottleneck for the application of interest.

In one example, resource consumption of a burst can be computed as follows. The radio energy consumed by a burst $B_i$ is computed as $\int_{t_1}^{t_2} P(S(t))dt$, where $S(t)$ is the inferred RRC state at time t and $P(.)$ is the power function. Additionally, $t_i$ is the time at which burst $B_i$ begins consuming radio resources. In some cases, $t_1$ is equal to the timestamp of the first packet of $B_i$. However, if $B_i$ begins with a downlink packet triggering a state promotion, $t_1$ can be shifted backward by the promotion delay since radio resources are allocated during the state promotion before the first packet arrives. In another example, $t_2$ is the timestamp of the first packet of the next burst $B_{i+1}$, as tail times incurred by $B_i$ are to be considered. (In some cases there may exist IDLE periods before $t_2$, but these periods do not consume any resources.) Similarly, $t_2$ is shifted backward by the promotion delay if necessary. The radio resources consumed by $B_i$ are quantified as the DCH occupation time between $t_1$ and $t_2$. In one example, radio resources allocated for shared low-speed FACH channels are ignored.

Figure 8:
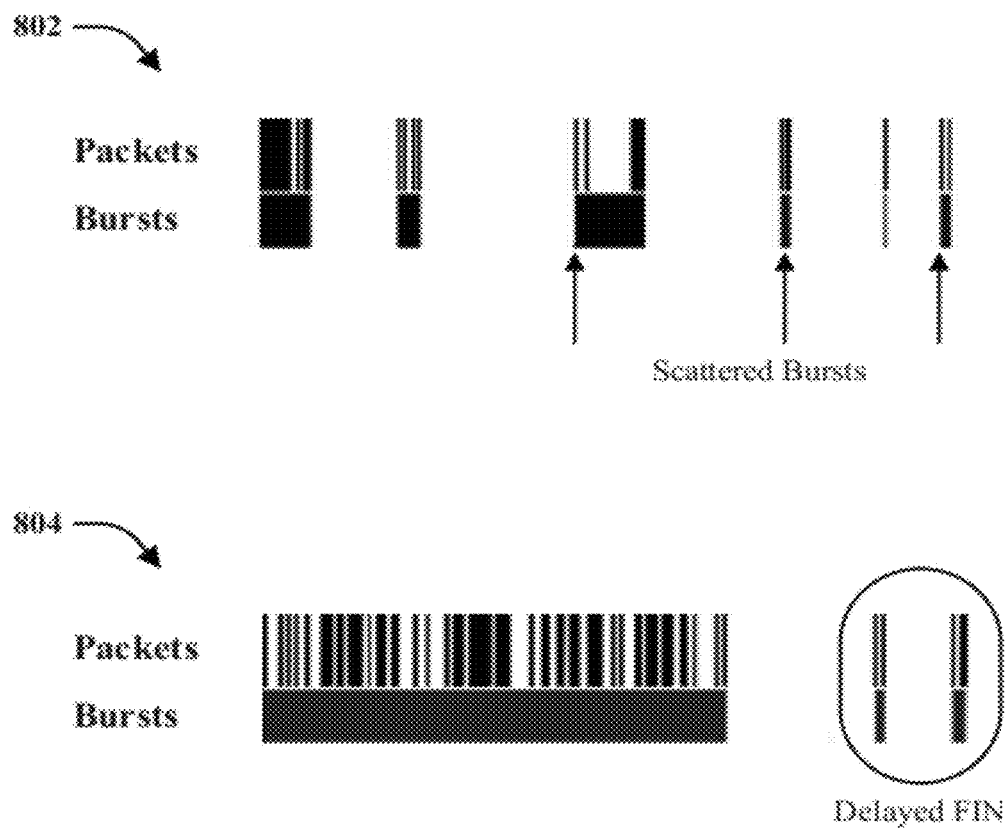
FIG. 8 illustrates respective example performance limiting factors of a mobility application that can be identified in accordance with various aspects.

In accordance with one aspect, various aspects of the iMAP tool and its associated algorithms provided herein are operable to detect and aid in mitigation of inefficiency associated with a mobility application in various manners. For example, as illustrated by diagram 802 in FIG. 8, iMAP can be utilized as described herein to mitigate energy inefficiency due to scattered bursts. Further, as illustrated by diagram 804, iMAP can be utilized as described herein to mitigate energy inefficiency caused by delayed FIN packets. Additionally or alternatively, iMAP can mitigate inefficiency caused by duplicate HTTP content. In another example, iMAP can operate as described herein to facilitate HTTP pipelining, in which HTTP requests are parallelized within a TCP session to improve latency and user experience.

Figure 9:
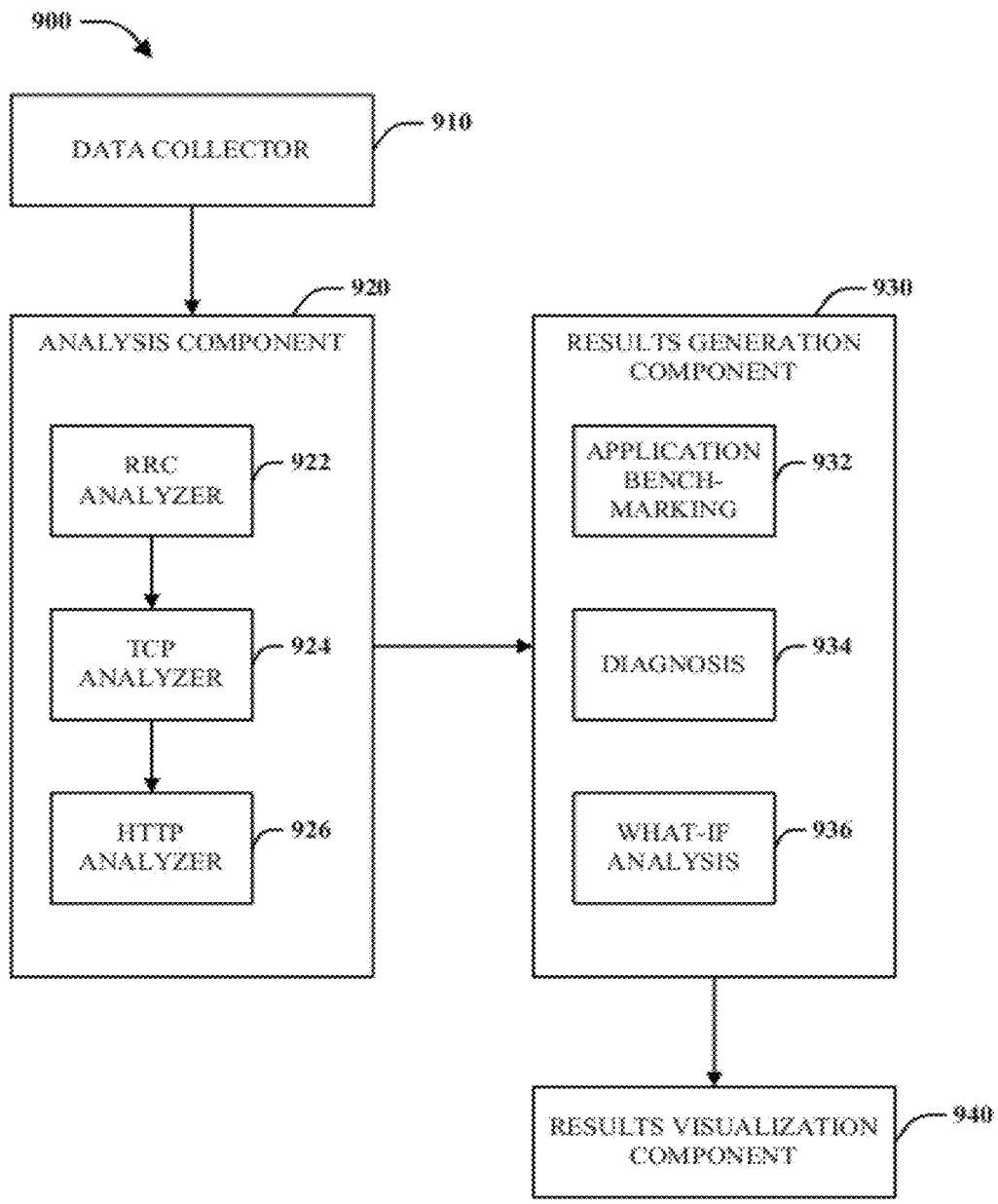
FIG. 9 is a block diagram of an example mobility application profiling system in accordance with various aspects.

Turning next to FIG. 9, an example mobility application profiling system 900 is illustrated in accordance with various aspects. System 900 includes a data collector 910, which operates on a handset to record network traces, user events, process information, etc. Information obtained via the data collector 910 is passed to an analysis component 920, which includes a RRC analyzer 922 that infers RRC states, applies an energy model and analyzes bursts; a TCP analyzer 924 that reassembles TCP sessions and identifies special TCP packets; and a HTTP analyzer 926 that identifies HTTP requests, responses and transferred objects. System 900 additionally includes a results generation component 930, which includes an application benchmarking component 932 that quantifies energy and radio resource efficiency, a diagnosis component 934 that pinpoints energy and radio resource inefficiencies and provides suggestions for improvement, and a what-if analysis component 936 that quantifies other scenarios (e.g., involving other carriers or devices). As further shown by system 900, results generated via results generation component 930 can be provided to a results visualization component 940 for display to a user.

In accordance with one aspect, application benchmarking component 932 can benchmark efficiency of a mobility application according to various metrics. For example, application benchmarking component 932 can benchmark an application according to DCH tail ratio, which is defined as the ratio of DCH tail time to the total DCH occupation time. In one example, a high tail ratio is indicative of low energy efficiency.

In another example, application benchmarking component 932 can benchmark an application with respect to state promotion ratio, which is defined as the ratio of the time spent in state promotions to the entire trace duration. In one example, a high promotion ratio indicates frequent state transitions, which increases the processing overhead of the RNC.

In a further example, application benchmarking component 932 can benchmark an application according to energy consumption per unit of data transfer, e.g., average joules per kilobyte transmitted. Additionally or alternatively, application benchmarking component 932 can benchmark an application according to the percentage of transferred data that is actually displayed and/or otherwise consumed.

Figure 10:
FIG. 10 is a block diagram of a system for facilitating visualization of mobility application profiling results in accordance with various aspects.

Referring to FIG. 10, a system 1000 for facilitating visualization of mobility application profiling results in accordance with various aspects is illustrated. System 1000 includes an application profiling component 1010, which generates application profiling results in accordance with various aspects described herein. These results are, in turn, provided to a visualization component 1020 for display to a user within a user interface (UI).

In one example, a UI generated by visualization component 1020 can include elements such as a trace viewer, a benchmark results viewer, a control panel (e.g., containing buttons and/or other control elements for opening a trace, selecting primary applications, correlating with other analysis tools, etc.), or the like. The trace viewer can illustrate the analysis results in an organized manner, e.g., in a series of rows with time represented by the horizontal axis. For example, the UI can include a "Packets" row that visualizes the timing dynamics for each packet, a "Bursts" row that shows identified bursts and their triggering factor (e.g., user-triggered, application-delay-triggered, protocol-triggered, non-primary-application bursts, etc.), a "User Input" row that presents recorded user input events, a "RRC States" row that illustrates different RRC states and state promotions, and/or any other suitable rows and/or other information. In another example, the benchmark results viewer can present DCH tail ratio, state promotion ratio, Joules per kilobyte, consumed data percentage, and/or any other suitable metrics. In addition, the UI can provide detailed breakdowns of the occupation time and the energy consumption for each RRC state.

Figure 11:
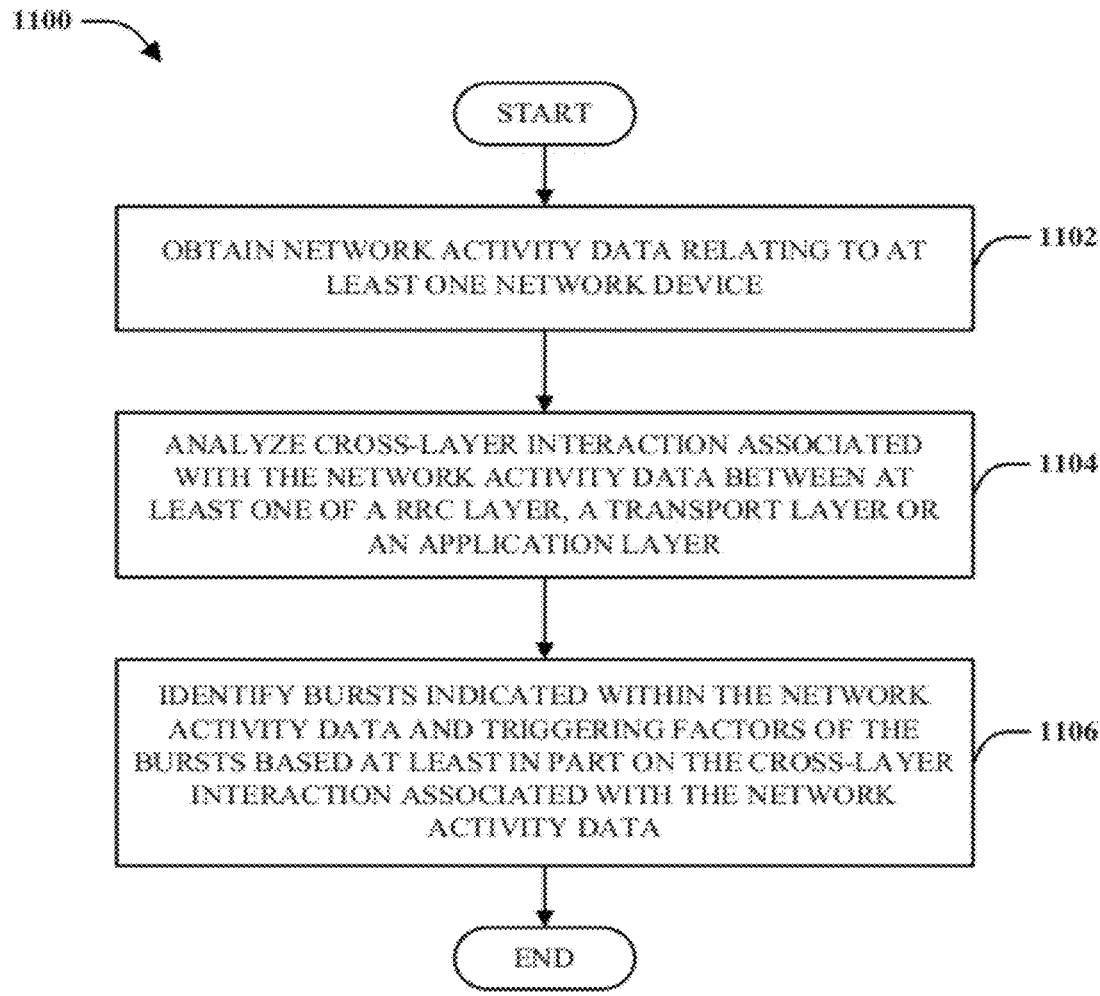
FIGS. 11-13 are flow diagrams of respective methodologies for analyzing operation of an application utilized by a mobile device in a wireless communication system.
Figure 12:
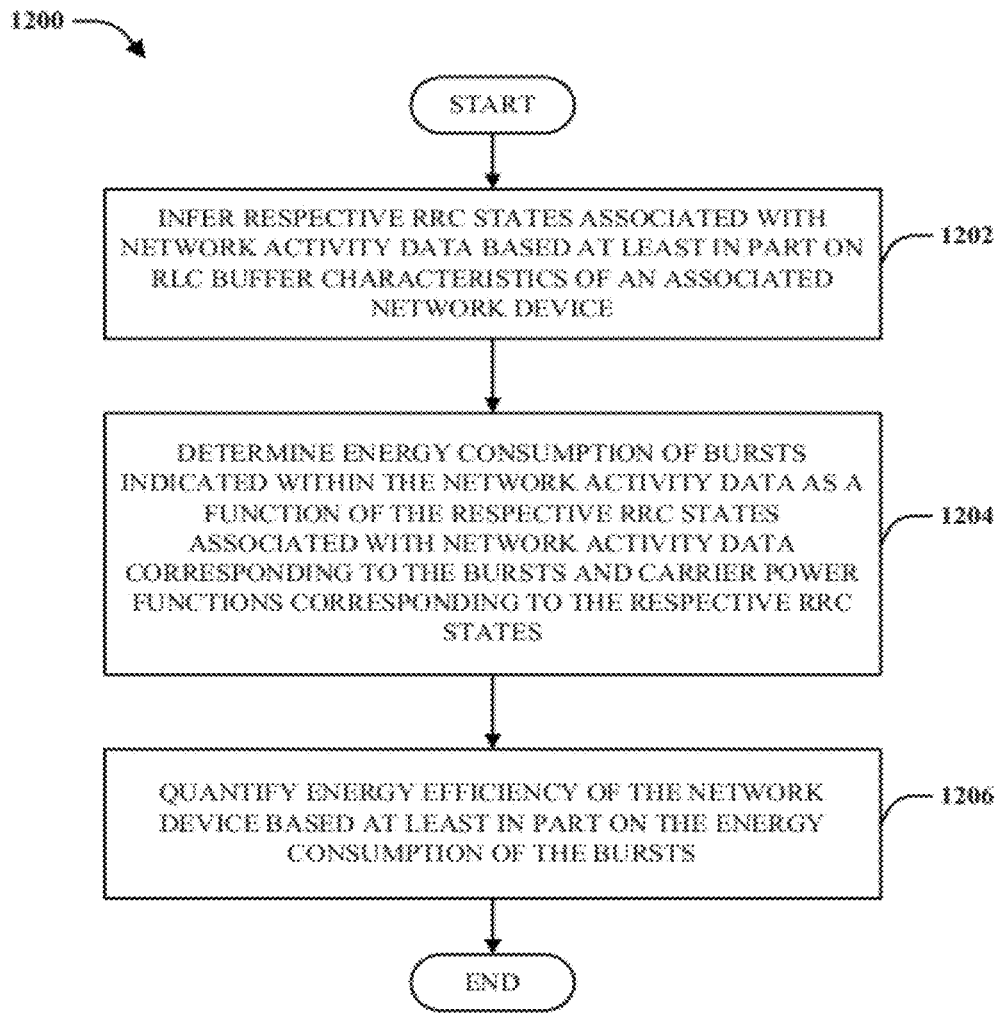
Figure 13:
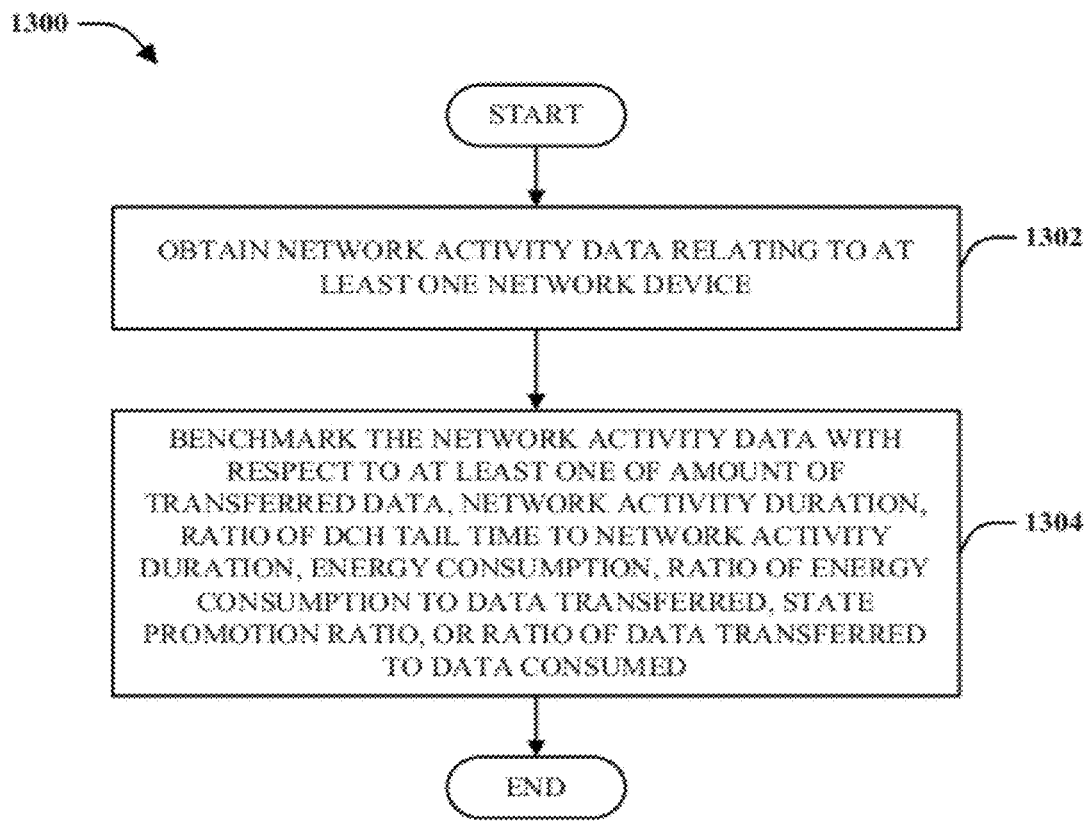

Referring now to FIGS. 11-13, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference first to FIG. 11, a methodology 1100 for analyzing operation of an application utilized by a mobile device in a wireless communication system is illustrated. Methodology 1100 begins at block 1102, wherein network activity data relating to at least one network device is obtained. At block 1104, cross-layer interaction associated with the network activity data obtained at block 1102 is analyzed with respect to at least one of a RRC layer, a transport layer or an application layer. At block 1106, bursts indicated within the network activity data obtained at block 1102 are identified along with triggering factors of the bursts based at least in part on the cross-layer interaction analyzed at block 1104.

Referring next to FIG. 12, a second methodology 1200 for analyzing operation of an application utilized by a mobile device in a wireless communication system is illustrated. Methodology 1200 begins at block 1202, wherein respective RRC states associated with network activity data are inferred based at least in part on RLC buffer characteristics of an associated network device. At block 1204, energy consumption of bursts indicated within the network activity data is determined as a function of the respective RRC states associated with network activity data corresponding to the bursts (as inferred at block 1202) and carrier power functions corresponding to the respective RRC states. At block 1206, energy efficiency of the network device is quantified based at least in part on the energy consumption of the bursts as determined at block 1204.

Turning to FIG. 13, a third methodology 1300 for analyzing operation of an application utilized by a mobile device in a wireless communication system is illustrated. Methodology 1300 begins at block 1302, wherein network activity data relating to at least one network device is obtained. At block 1304, the network activity data obtained at block 1302 are benchmarked with respect to at least one of amount of transferred data, network activity duration, ratio of DCH tail time to network activity duration, energy consumption, ratio of energy consumption to data transferred, state promotion ratio, or ratio of data transferred to data consumed.

Figure 14:
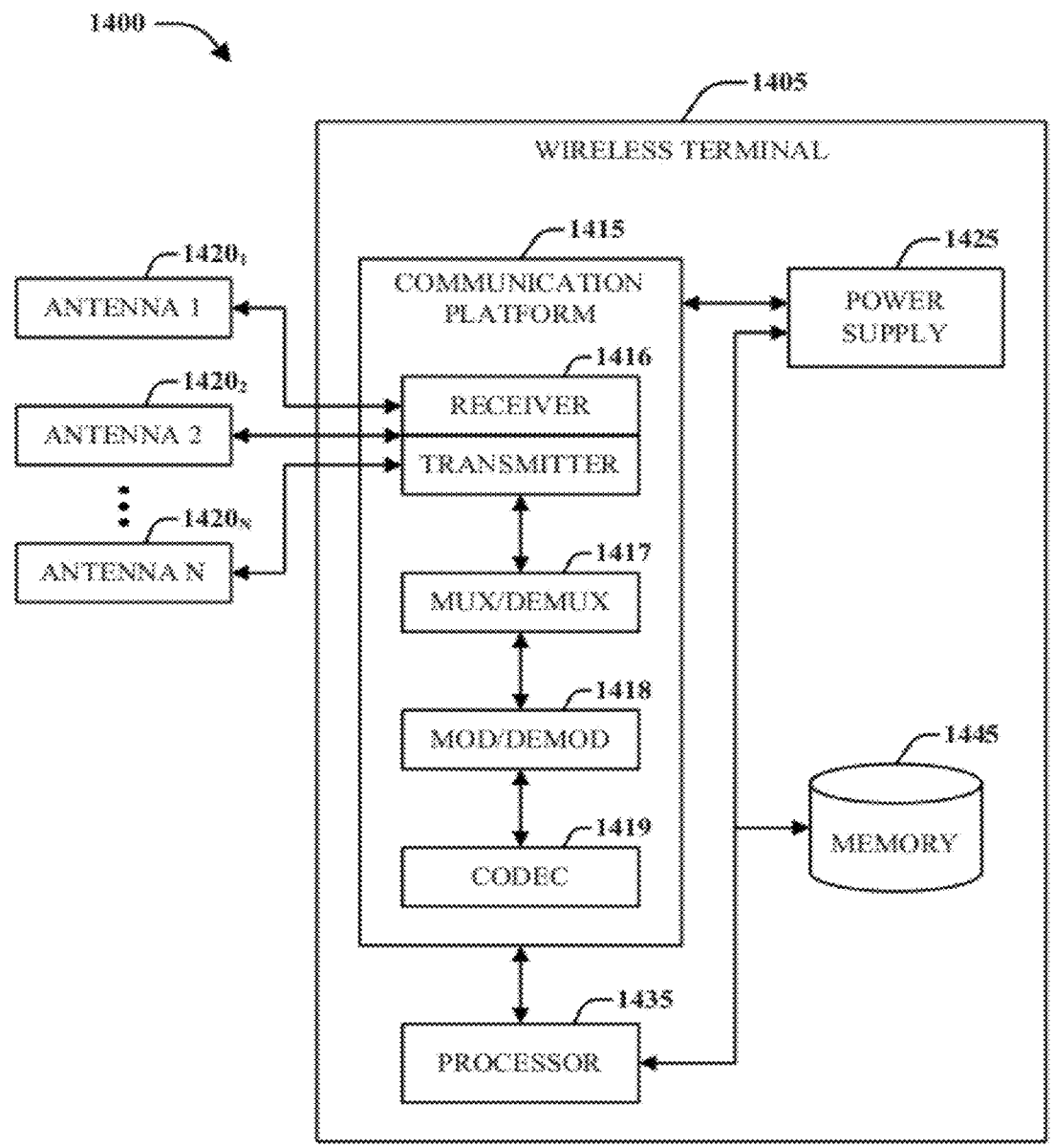
FIG. 14 illustrates an example network device that can be utilized to implement one or more of the various aspects described herein.

In order to provide further context for various aspects of the disclosed subject matter, FIG. 14 illustrates a non-limiting example system 1400 that can implement some or all of the aspects described herein. As FIG. 14 illustrates, system 1400 can include a wireless terminal 1405. In an embodiment, wireless terminal 1405 can receive and transmit signal(s) to and/or from wireless devices such as femto access points, access terminals, wireless ports and routers, or the like, through a set of N antennas 1420. In one example, antennas 1420 can be implemented as part of a communication platform 1415, which in turn can comprise electronic components and associated circuitry and/or other means that provide for processing and manipulation of received signal(s) and signal(s) to be transmitted.

In an aspect, communication platform 1415 can include a receiver/transmitter or transceiver 1416, which can transmit and receive signals and/or perform one or more processing operations on such signals (e.g., conversion from analog to digital upon reception, conversion from digital to analog upon transmission, etc.). In addition, transceiver 1416 can divide a single data stream into multiple, parallel data streams, or perform the reciprocal operation.

In another example, a multiplexer/demultiplexer (mux/demux) unit 1417 can be coupled to transceiver 1416. Mux/demux unit 1417 can, for example, facilitate manipulation of signal in time and frequency space. Additionally or alternatively, mux/demux unit 1417 can multiplex information (e.g., data/traffic, control/signaling, etc.) according to various multiplexing schemes such as time division multiplexing (TDM), frequency division multiplexing (FDM), orthogonal frequency division multiplexing (OFDM), code division multiplexing (CDM), space division multiplexing (SDM), or the like. In addition, mux/demux unit 1417 can scramble and spread information according to substantially any code generally known in the art, such as Hadamard-Walsh codes, Baker codes, Kasami codes, polyphase codes, and so on.

In a further example, a modulator/demodulator (mod/demod) unit 1418 implemented within communication platform 1415 can modulate information according to multiple modulation techniques, such as frequency modulation, amplitude modulation (e.g., N-ary quadrature amplitude modulation (N-QAM), etc.), phase-shift keying (PSK), and the like. Further, communication platform 1415 can also include a coder/decoder (codec) module 1419 that facilitates decoding received signal(s) and/or coding signal(s) to convey.

According to another aspect, wireless terminal 1405 can include a processor 1435 configured to confer functionality, at least in part, to substantially any electronic component utilized by wireless terminal 1405. As further shown in system 1400, a power supply 1425 can attach to a power grid and include one or more transformers to achieve a power level at which various components and/or circuitry associated with wireless terminal 1405 can operate. In one example, power supply 1425 can include a rechargeable power mechanism to facilitate continued operation of wireless terminal 1405 in the event that wireless terminal 1405 is disconnected from the power grid, the power grid is not operating, etc.

In a further aspect, processor 1435 can be functionally connected to communication platform 1415 and can facilitate various operations on data (e.g., symbols, bits, chips, etc.), which can include, but are not limited to, effecting direct and inverse fast Fourier transforms, selection of modulation rates, selection of data packet formats, inter-packet times, etc. In another example, processor 1435 can be functionally connected, via a data or system bus, to any other components or circuitry not shown in system 1400 to at least partially confer functionality to each of such components.

As additionally illustrated in system 1400, a memory 1445 can be used by wireless terminal 1405 to store data structures, code instructions and program modules, system or device information, code sequences for scrambling, spreading and pilot transmission, location intelligence storage, determined delay offset(s), over-the-air propagation models, and so on. Processor 1435 can be coupled to the memory 1445 in order to store and retrieve information necessary to operate and/or confer functionality to communication platform 1415 and/or any other components of wireless terminal 1405.

Figure 15:
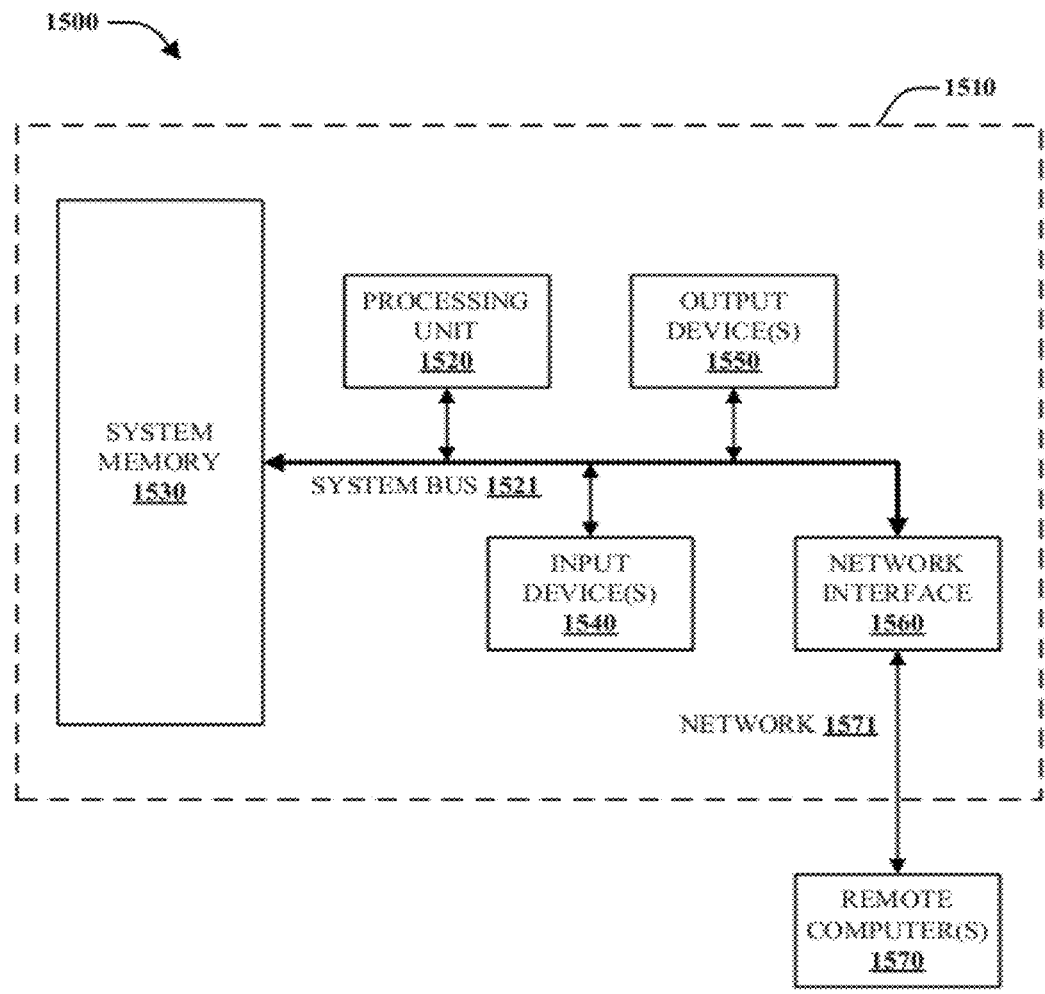
FIG. 15 illustrates an example computing architecture that is operable to execute various aspects described herein.

Turning to FIG. 15, a non-limiting example computing system or operating environment in which various aspects of the disclosed subject matter may be implemented is illustrated. One of ordinary skill in the art can appreciate that handheld, portable and other computing devices and computing objects of all kinds are contemplated for use in connection with the disclosed subject matter, e.g., anywhere that a communications system may be desirably configured. Accordingly, the below general purpose remote computer described below in FIG. 15 is but one example of a computing system in which the disclosed subject matter may be implemented.

Although not required, various aspects of the disclosed subject matter can partly be implemented via an operating system, for use by a developer of services for a device or object, and/or included within application software that operates in connection with the component(s) of the disclosed subject matter. Software may be described in the general context of computer-executable instructions, such as program modules, being executed by one or more computers, such as client workstations, servers or other devices. Those skilled in the art will appreciate that various aspects of the disclosed subject matter may be practiced with other computer system configurations and protocols.

FIG. 15 thus illustrates an example of a suitable computing system environment 1500 in which various aspects of the disclosed subject matter may be implemented, although as made clear above, the computing system environment 1500 is only one example of a suitable computing environment for a media device and is not intended to suggest any limitation as to the scope of use or functionality of the disclosed subject matter. Neither should the computing environment 1500 be interpreted as having any dependency or requirement relating to any one or combination of components illustrated in the example operating environment 1500.

With reference to FIG. 15, an example of a computing environment 1500 for implementing various aspects of the disclosed subject matter includes a general purpose computing device in the form of a computer 1510. Components of computer 1510 can include, but are not limited to, a processing unit 1520, a system memory 1530, and a system bus 1521 that couples various system components including the system memory to the processing unit 1520. The system bus 1521 can be any of several types of bus structures including a memory bus or memory controller, a peripheral bus, and a local bus using any of a variety of bus architectures.

Computer 1510 can include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, Electrically Erasable Programmable ROM (EEPROM), flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and include any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The system memory 1530 can include computer storage media in the form of volatile and/or nonvolatile memory such as read only memory (ROM) and/or random access memory (RAM). A basic input/output system (BIOS), containing the basic routines that help to transfer information between elements within computer 1510, such as during start-up, can be stored in memory 1530. Memory 1530 typically also contains data and/or program modules that are immediately accessible to and/or presently being operated on by processing unit 1520. By way of example, and not limitation, memory 1530 can also include an operating system, application programs, other program modules, and program data.

The computer 1510 can also include other removable/non-removable, volatile/nonvolatile computer storage media. For example, computer 1510 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 1521 through a non-removable memory interface such as an interface, and a magnetic disk drive or optical disk drive is typically connected to the system bus 1521 by a removable memory interface, such as an interface.

A user can enter commands and information into the computer 1510 through input devices such as a keyboard and pointing device, commonly referred to as a mouse, trackball or touch pad. Other input devices can include a microphone, joystick, game pad, satellite dish, scanner, or the like. These and other input devices are often connected to the processing unit 1520 through user input 1540 and associated interface(s) that are coupled to the system bus 1521, but can be connected by other interface and bus structures, such as a parallel port, game port or a universal serial bus (USB). A graphics subsystem can also be connected to the system bus 1521. A monitor or other type of display device is also connected to the system bus 1521 via an interface, such as output interface 1550, which can in turn communicate with video memory. In addition to a monitor, computers can also include other peripheral output devices such as speakers and a printer, which can be connected through output interface 1550.

The computer 1510 can operate in a networked or distributed environment using logical connections to one or more other remote computers, such as remote computer 1570, which can in turn have media capabilities different from device 1510. The remote computer 1570 can be a personal computer, a server, a router, a network PC, a peer device or other common network node, or any other remote media consumption or transmission device, and can include any or all of the elements described above relative to the computer 1510. The logical connections depicted in FIG. 15 include a network 1571, such local area network (LAN) or a wide area network (WAN), but can also include other networks/buses. Such networking environments are commonplace in homes, offices, enterprise-wide computer networks, intranets and the Internet.

When used in a LAN networking environment, the computer 1510 is connected to the LAN 1571 through a network interface or adapter. When used in a WAN networking environment, the computer 1510 typically includes a communications component, such as a modem, or other means for establishing communications over the WAN, such as the Internet. A communications component, such as a modem, which can be internal or external, can be connected to the system bus 1521 via the user input interface of input 1540, or other appropriate mechanism. In a networked environment, program modules depicted relative to the computer 1510, or portions thereof, can be stored in a remote memory storage device. It will be appreciated that the network connections shown and described are exemplary and other means of establishing a communications link between the computers can be used.

It is to be noted that aspects, features, and/or advantages of the disclosed subject matter can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s).

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of systems and methods that provide advantages of the disclosed subject matter. It is, of course, not possible to describe every conceivable combination of components or methodologies for purposes of describing the disclosed subject matter, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   receiving, by a system comprising a processor, network activity data relating to a network device;
   analyzing, by the system, cross-layer interaction related to a radio resource control layer of an application executed by the network device;
   in response to the analyzing, determining, by the system, a communication burst is represented in the network activity data; and
   in response to the determining the communication burst is represented in the network activity data, profiling, by the system, the application executed by the network device.

2. The method of claim 1, further comprising:
   generating, by the system, a report relating to the cross-layer interaction.

3. The method of claim 1, wherein the analyzing comprises:
   inferring radio resource control states associated with the network activity data based on a radio link control buffer characteristic of the network device.

4. The method of claim 3, further comprising:
   determining, by the system, an energy consumption associated with the communication burst as a function of the radio resource control states and power functions corresponding to the radio resource control states.

5. The method of claim 4, further comprising:
   quantifying, by the system, an energy efficiency associated with the of the network device based on the energy consumption associated with the communication burst.

6. The method of claim 1, further comprising:
   analyzing, by the system, a first value representing a first resource usage efficiency associated with the communication burst; and
   generating, by the system, a report relating to a burst combination associated with a second value representing a second resource usage efficiency that is higher than the first value.

7. The method of claim 1, wherein the receiving comprises:
   receiving a set of packet traces from the network device.

8. The method of claim 7, wherein the receiving the set of packet traces comprises:
   determining a target application that is associated with the network device; and
   determining a packet trace within the set of packet traces that relates to the target application.

9. The method of claim 1, wherein the receiving comprises:
   receiving information relating to an application activity associated with the network device.

10. The method of claim 1, wherein the analyzing comprises:
    performing transmission control protocol analysis with respect to the network activity data based on extracting transmission control protocol flows from the network activity data and determining properties of data packets associated with the transmission control protocol flows.

11. The method of claim 1, wherein the analyzing comprises:
    reassembling transmission control protocol flows corresponding to the network activity data;
    parsing the transmission control protocol flows according to a hypertext transfer protocol; and determining relationships between packets of the transmission control protocol flows and hypertext transfer protocol requests.

12. The method of claim 1, wherein the determining comprises:
determining a triggering factor of the communication burst based on information within the network activity data representing burst size.

13. A system, comprising:
a memory to store instructions; and
a processor, coupled to the memory, that facilitates execution of the instructions to perform operations, comprising:
receiving information relating to communication activity of a network device;
conducting a cross-layer analysis of the information with respect to a radio resource control layer of an application executed by the network device;
identifying a communications burst within the communication activity of the network device; and
characterizing the application in response to the conducting of the cross-layer analysis and the identifying of the communications burst.

14. The system of claim 13, wherein the operations further comprise:
identifying, based on the information, radio resource control state transitions associated with the communication activity of the network device.

15. The system of claim 13, wherein the operations further comprise:
relating the communications burst to the application; and
determining, based on a resource usage efficiency associated with the communications burst, a burst combination.

16. The system of claim 13, wherein the operations further comprise determining, based on a radio resource control state associated with the communication burst, an energy efficiency of the network device as a function of an energy consumption determined to be associated with the communication burst.

17. The system of claim 13, wherein the operations further comprise:
extracting transmission control protocol flows from the information; and
identifying properties of packets associated with the transmission control protocol flows.

18. A computer readable storage device comprising computer-executable instructions that, in response to execution, cause a system comprising a processor to perform operations, comprising:
receiving network device operation data comprising packet trace data associated with a network device;
performing a cross-layer analysis of the network device operation data with respect to a radio resource control layer associated with an application executed by the network device;
determining a burst that is represented in the network device operation data; and
generating a performance profile of the application in part on in response to the performing of the cross-layer analysis of the network device operation data, and in response to the determining that the burst is represented in the network device operation data.

19. The computer readable storage device of claim 18, wherein the operations further comprise:
inferring radio resource control states associated with the network device operation data based on a radio link control buffer characteristic of the network device.

20. The computer readable storage device of claim 18, wherein the operations further comprise:
determining an energy consumption associated with the burst based on radio resource control states associated with the network device operation data and power functions corresponding to the radio resource control states.

* * * * *